United States Patent
Sun et al.

(10) Patent No.: US 11,906,827 B2
(45) Date of Patent: Feb. 20, 2024

(54) METHOD FOR DETERMINING LIGHT-LEAKAGE DEGREE OF DISPLAY PANEL, TEST FIXTURE AND COMPUTER-READABLE STORAGE MEDIUM

(71) Applicants: Beijing BOE Display Technology Co., Ltd., Beijing (CN); BOE Technology Group Co., Ltd., Beijing (CN)

(72) Inventors: Hanyan Sun, Beijing (CN); Minghui Zhang, Beijing (CN); Weitao Chen, Beijing (CN); Xiaopeng Cui, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 45 days.

(21) Appl. No.: 17/628,809

(22) PCT Filed: Mar. 15, 2021

(86) PCT No.: PCT/CN2021/080884
§ 371 (c)(1),
(2) Date: Jan. 20, 2022

(87) PCT Pub. No.: WO2022/193102
PCT Pub. Date: Sep. 22, 2022

(65) Prior Publication Data
US 2023/0161186 A1    May 25, 2023

(51) Int. Cl.
*G02F 1/13* (2006.01)
*G09G 3/00* (2006.01)

(52) U.S. Cl.
CPC .......... *G02F 1/1309* (2013.01); *G09G 3/006* (2013.01); *G09G 2360/16* (2013.01)

(58) Field of Classification Search
CPC ... G02F 1/1309; G09G 3/006; G09G 2360/16
See application file for complete search history.

(56) References Cited

U.S. PATENT DOCUMENTS 5,825,196 A    10/1998   Irie et al.
10,210,604 B2 *   2/2019   Jin ........................ G06T 5/007
(Continued)

FOREIGN PATENT DOCUMENTS

CN    103971624 A    8/2014
CN    106780521 A    5/2017
(Continued)

*Primary Examiner* — Akm Zakaria
(74) *Attorney, Agent, or Firm* — IPro, PLLC

(57) ABSTRACT

Provided is a method for determining a light-leakage degree of a display panel, applicable to a light-leakage detecting device, wherein a display region of the display panel comprises a plurality of sub-regions, and the method includes: acquiring a brightness value of each of the sub-regions when a target color is displayed in the display region; and determining, in response to detecting that the plurality of sub-regions comprise at least one light-leakage sub-region, the light-leakage degree of the display panel based on an average of brightness values of the plurality of sub-regions and a brightness value of the light-leakage sub-region.

13 Claims, 9 Drawing Sheets

(56) References Cited

U.S. PATENT DOCUMENTS

| | | | | |
|---|---|---|---|---|
| 2012/0154355 A1* | 6/2012 | Kawai | ............... | H04N 5/58 |
| | | | | 345/207 |
| 2014/0214367 A1* | 7/2014 | Tong | ............... | G02F 1/1309 |
| | | | | 702/189 |
| 2015/0117775 A1* | 4/2015 | Abe | ............... | H04N 1/407 |
| | | | | 382/167 |
| 2022/0383783 A1* | 12/2022 | Yamazaki | ............ | G09G 3/3233 |

FOREIGN PATENT DOCUMENTS

| | | |
|---|---|---|
| CN | 107193139 A | 9/2017 |
| CN | 107229144 A | 10/2017 |
| CN | 107576663 A | 1/2018 |
| CN | 108682368 A | 10/2018 |
| CN | 208399848 U | 1/2019 |
| CN | 109856828 A | 6/2019 |
| JP | 2002250696 A | 9/2002 |

\* cited by examiner

METHOD FOR DETERMINING LIGHT-LEAKAGE DEGREE OF DISPLAY PANEL, TEST FIXTURE AND COMPUTER-READABLE STORAGE MEDIUM

This application is a U.S. national stage of international application No. PCT/CN2021/080884, filed on Mar. 15, 2021, the disclosure of which is herein incorporated by reference in its entirety.

TECHNICAL FIELD

The present disclosure relates to the field of display technologies, and in particular to a method, a device and a system for determining a light-leakage degree of a display panel, and a test fixture.

BACKGROUND

During a manufacturing process of a display panel, factors such as process errors may lead to a light-leakage in a display region of the display panel. Therefore, after the display panel is manufactured, an inspector may determine a severity level of the light-leakage of the display panel based on experience, and then determine whether the display panel meets factory conditions.

However, the reliability of the inspector to judge the severity level of the light-leakage of the display panel based on experience is low.

SUMMARY

Embodiments of the present disclosure provide a method, a device and a system for determining a light-leakage degree of a display panel, and a test fixture. The technical solutions provided are as follows:

According to one aspect of the present disclosure, a method for determining a light-leakage degree of a display panel is provided, wherein the method is applicable to a light-leakage detection device, and a display region of the display panel includes a plurality of sub-regions. The method includes:

acquiring a brightness value of each of the sub-regions when a target color is displayed in the display region; and determining, in response to detecting that the plurality of sub-regions include at least one light-leakage sub-region, the light-leakage degree of the display panel based on an average of brightness values of the plurality of sub-regions and a brightness value of the light-leakage sub-region.

Optionally, the brightness value of the light-leakage sub-region is greater than or equal to a brightness threshold, and the light-leakage degree is positively correlated with the brightness value of the light-leakage sub-region and is negatively correlated with the average of brightness values of the plurality of sub-regions.

Optionally, the brightness threshold L satisfies the following formula: $L=L_0+J$;

wherein $L_0$ is the average of brightness values of the plurality of sub-regions, and the J is a minimum perceivable brightness difference.

Optionally, the minimum perceivable brightness difference J satisfies the following formula:

$$J = K_0 + K_1 \times L_0 - K_2 \times L_0^2 + \sum_{z=3}^{n} K_z \times L_0^z;$$

or the minimum perceivable brightness difference J satisfies: $J=K \times L_0$;

wherein n is an integer greater than or equal to 3, $K_0$ is greater than or equal to 0.01 and less than or equal to 0.05, $K_1$ is greater than or equal to 0.01 and less than or equal to 0.03, and $K_2$ is greater than or equal to 0 and less than or equal to 0.001; and K is greater than or equal to 0.01 and less than or equal to 0.03.

Optionally, n is equal to 3, $K_3$ is greater than or equal to 0 and less than or equal to 0.001.

Optionally, the target color is black.

Optionally, determining the light-leakage degree of the display panel based on the average of brightness values of the plurality of sub-regions and the brightness value of the light-leakage sub-region includes:

determining a first ratio of the brightness value of the light-leakage sub-region to the average of brightness values of the plurality of sub-regions;

determining a second ratio of an area of the light-leakage sub-region to an area of the display region; and determining the light-leakage degree of the display panel based on the first ratio and the second ratio, wherein the light-leakage degree is positively correlated with the first ratio and positively correlated with the second ratio.

Optionally, the plurality of sub-regions includes at least two light-leakage sub-regions; and determining the light-leakage degree of the display panel based on the first ratio and the second ratio includes:

acquiring at least two products by respectively determining a product of the first ratio and the second ratio corresponding to each of the light-leakage sub-regions; and determining the light-leakage degree of the display panel based on a sum of the at least two products.

Optionally, acquiring the brightness value of each of the sub-regions when the target color is displayed in the display region includes:

acquiring, in the case that no force is applied to the display panel, a first brightness value of each of the sub-regions when the target color is displayed in the display region, and acquiring, in the case that a force is applied to the display panel by a test fixture, a second brightness value of each of the sub-regions when the target color is displayed in the display region;

determining the light-leakage degree of the display panel based on the average of brightness values of the plurality of sub-regions and the brightness value of the light-leakage sub-region includes:

determining a first light-leakage degree of the display panel based on an average of the first brightness values of the plurality of sub-regions and a first brightness value of the light-leakage sub-region, and determining a second light-leakage degree of the display panel based on an average of the second brightness values of the plurality of sub-regions and a second brightness value of the light-leakage sub-region; and the method further includes:
determining, based on the first light-leakage degree, the second light-leakage degree and a deformation amount of the display panel under the force, a first light-leakage sensitivity caused by a unit of the deformation amount, wherein the first light-leakage sensitivity is negatively correlated with both the first light-leakage degree and the deformation amount and positively correlated with the second light-leakage degree.

Optionally, the first light-leakage sensitivity ΔM satisfies the following formula $$\Delta M = \frac{M_1 - M_0}{f};$$

wherein
the $M_1$ is the second light-leakage degree, the $M_0$ is the first light-leakage degree, and the f is the deformation amount.

Optionally, acquiring, in the case that the force is applied to the display panel by the test fixture, the second brightness value of each of the sub-regions when the target color is displayed in the display region includes:
acquiring, in the case that a first force is applied to the display panel by the test fixture, a first target brightness value of each of the sub-regions when the target color is displayed in the display region, and acquiring, in the case that a second force is applied to the display panel by the test fixture, a second target brightness value of each of the sub-regions when the target color is displayed in the display region, wherein a direction of the first force is opposite to a direction of the second force;
determining the second light-leakage degree of the display panel based on the average of the second brightness values of the plurality of sub-regions and the second brightness value of the light-leakage sub-region includes:
determining a first target light-leakage degree of the display panel based on an average of the first target brightness values of the plurality of sub-regions and a first target brightness value of the light-leakage sub-region, and determining a second target light-leakage degree of the display panel based on an average of the second target brightness values of the plurality of sub-regions and a second target brightness value of the light-leakage sub-region;
determining, based on the first light-leakage degree, the second light-leakage degree, and the deformation amount of the display panel under the force, the first light-leakage sensitivity caused by the unit of the deformation amount includes:
determining, based on the first light-leakage degree, the first target light-leakage degree and a first deformation amount of the display panel under the first force, a first reference light-leakage sensitivity caused by a unit first deformation amount, and determining, based on the first light-leakage degree, the second target light-leakage degree and a second deformation amount of the display panel under the second force, a second reference light-leakage sensitivity caused by a unit second deformation amount; and
the method further includes:
determining an average of the first reference light-leakage sensitivity and the second reference light-leakage sensitivity as a second light-leakage sensitivity caused by the unit first deformation amount and the unit second deformation amount.

According to another aspect of the present disclosure, a device for determining a light-leakage degree of a display panel is provided, wherein the device is applicable to a light-leakage detection device, and a display region of the display panel includes a plurality of sub-regions. The device includes: a memory storing at least one computer program, and a processor;
wherein the processor, when executing the at least one computer program, is caused to perform:
acquiring a brightness value of each of the sub-regions when a target color is displayed in the display region; and
determining, in response to detecting that the plurality of sub-regions include at least one light-leakage sub-region, the light-leakage degree of the display panel based on an average of brightness values of the plurality of sub-regions and a brightness value of the light-leakage sub-region.

According to yet another aspect of the present disclosure, a test fixture for a display panel is provided. The test fixture is applicable to the method for determining the light-leakage degree of the display panel according to the above aspect, and the test fixture includes: a hollow frame, an adjusting component, and an external force applying component; wherein
the frame is configured to fix the display panel;
the adjusting component is movably connected to the frame and fixedly connected to the external force applying component, and the adjusting component is configured to adjust a position of the external force applying component in the frame; and
the external force applying component is configured to apply a force to the display panel.

Optionally, the test fixture further includes a first fixing plate and a second fixing plate:
the first fixing plate, combined with a first side of the frame, is configured to clamp a first side of the display panel;
the second fixing plate, combined with a second side of the frame, is configured to clamp a second side of the display panel;
the adjusting component includes a first adjusting rod and at least one fixing members, the first adjusting rod is provided with at least one first through hole, a third side of the frame is provided with a plurality of adjusting holes, and each of the fixing members is configured to be connected to one of the adjusting holes by passing through one of the first through holes; and
wherein the first side and the third side are intersected with the second side respectively.

Optionally, the test fixture further includes a first bolt and a second bolt;
both the first fixing plate and the first side of the frame are provided with a second through hole, the first bolt being configured to be connected to the first side of the frame by passing through the second through hole; and
both the second fixing plate and the second side of the frame are provided with a third through hole, the second bolt being configured to be connected to the second side of the frame by passing through the third through hole.

Optionally, the external force applying component includes a third fixing plate, a second adjusting rod, a clamping member, a contacting member, and an adjusting member;

the third fixing plate is fixedly connected to the first adjusting rod, the third fixing plate is provided with a fourth through hole, one end of the second adjusting rod is configured to pass through the fourth through hole, and the other end of the second adjusting rod is configured to adjust a length of a part of the second adjusting rod that protrudes from the fourth through hole;

the clamping member is fixedly connected to the contacting member and is configured to clamp the display panel; and the adjusting member is respectively connected to the first adjusting rod and the clamping member, and the adjusting member is configured to adjust a position of the clamping member in a direction perpendicular to a display surface of the display panel, such that the contacting member fixedly connected to the clamping member is in contact with the one end of the second adjusting rod.

Optionally, the adjusting member includes: a fourth fixing plate and a first screw; and the fourth fixing plate is fixedly connected to the first adjusting rod, the fourth fixing plate is provided with a sixth through hole, one end of the first screw is fixedly connected to the clamping member by passing through the sixth through hole, and the first screw is configured to adjust a position of the clamping member in a direction perpendicular to a display surface of the display panel.

Optionally, the clamping member includes two fifth fixing plates arranged oppositely and fixedly connected, a second screw and a movable plate disposed between the two fifth fixing plates, and wherein one of the fifth fixing plates is provided with a seventh through hole, one end of the second screw is fixedly connected to the movable plate by passing through the seventh through hole, and the second screw is configured to adjust a distance between the movable plate and any one of the fifth fixing plates.

According to still another aspect of the present disclosure, a system for determining a light-leakage degree of a display panel is provided. The system includes the apparatus for determining the light-leakage degree of the display panel according to the above aspect, and the test fixture according to the above aspect.

According to yet another aspect of the present disclosure, a computer-readable storage medium storing at least one instruction therein is provided. Wherein the at least one instruction, when loaded and executed by a processor, causes the processor to perform the method for determining the light-leakage degree of the display panel according to the above aspect.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Through the above-mentioned drawings, the specific embodiments of the present application are shown, which are described in more detail later. These drawings and text descriptions are not intended to limit the scope of the concept of the present application in any way, but to explain the concept of the present disclosure to those skilled in the art by referring to specific embodiments.

DETAILED DESCRIPTION

The present disclosure is described in further detail with reference to the enclosed drawings, to clearly present the objects, technique solutions, and advantages of the present disclosure.

Figure 1:
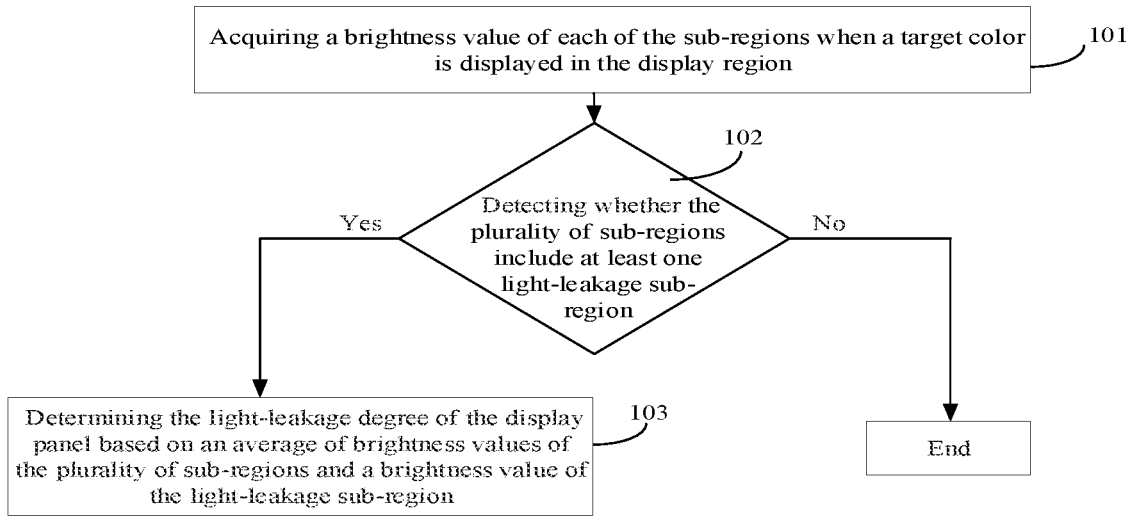
FIG. 1 is a flowchart of a method for determining a light-leakage degree of a display panel according to some embodiments of the present disclosure.

FIG. 1 is a flowchart of a method for determining a light-leakage degree of a display panel according to some embodiments of the present disclosure. The method is applicable to a light-leakage detection device, and the light-leakage detection device may be a device with data processing capability, such as a computer. As shown in FIG. 1, the method may include following steps.

In step 101, a brightness value of each of sub-regions of a display region is acquired when a target color is displayed in the display region.

In the embodiment of the present disclosure, the display region of the display panel may be divided into a plurality of sub-regions, and a sum of areas of the plurality of sub-regions is equal to an area of the display region, when performing light-leakage detection, a target color may be controlled to be displayed in the display region. The light-leakage detection device may acquire a brightness value of each of the sub-regions when the target color is displayed in the display region.

In the embodiment of the present disclosure, the light-leakage detection device may be established a connection with a brightness detection device. The brightness detection device may detect the brightness value of each of the sub-regions when the target color is displayed in the display region, and may send the detected brightness value of each of the sub-regions to the light-leakage detection device. Each of the sub-regions may include one or more pixels.

Optionally, the brightness detection device may be a surface-type photographing optical device or a point-type measuring optical device. The detection accuracy of the surface-type photographing optical device is micron level, that is, the surface-type photographing optical device may detect a brightness value of a micron-level pixel. The detection accuracy of the point-type measuring optical device is millimeter-level, that is, the point-type measuring optical device may detect a brightness value of a millimeter-level detection point.

In step 102, whether the plurality of sub-regions include at least one light-leakage sub-region is detected.

After acquiring brightness values of the plurality of sub-regions, the light-leakage detection device may detect whether the plurality of sub-regions include at least one light-leakage sub-region based on the brightness values of the plurality of sub-regions. If it is detected that the plurality of sub-regions include at least one light-leakage sub-region, the light-leakage detection device may perform a step 103; and if it is detected that the plurality of sub-regions do not include a light-leakage sub-region, it may be determined that the display panel has no problem of light-leakage, and this process ends.

Optionally, the light-leakage detection device may detect whether there is a sub-region with a brightness value greater than or equal to a brightness threshold in the plurality of sub-regions. If such a sub-region exists, the light-leakage detection device may determine the sub-region with a brightness value greater than or equal to the brightness threshold as a light-leakage sub-region; and if such a sub-region does not exist, the light-leakage detection device may determine that there is no light-leakage sub-region in the plurality of sub-regions, and then determine that the display panel has no problem of light-leakage.

In step 103, a light-leakage degree of the display panel is determined based on an average of brightness values of the plurality of sub-regions and a brightness value of the light-leakage sub-region.

The light-leakage detection device may determine the average of brightness values of the plurality of sub-regions after determining that the plurality of sub-regions include at least one light-leakage sub-region, and may determine a light-leakage degree of the display panel based on the average of brightness values of the plurality of sub-regions and the brightness value of the light-leakage sub-region.

In summary, the embodiments of the present disclosure provide a method for determining a light-leakage degree of a display panel. When a light-leakage detection device detected that the plurality of sub-regions of the display panel include at least one light-leakage sub-region, the light-leakage detection device can determine a light-leakage degree of the display panel based on an average of brightness values of the plurality of sub-regions and a brightness value of the light-leakage sub-region. Compared with a way that an inspector manually determines a light-leakage degree, the light-leakage detection device can automatically determine the light-leakage degree of the display panel based on brightness values of the sub-regions by the method according to the embodiment of the present disclosure, thereby effectively improving the reliability and accuracy of the light-leakage degree of the display panel as determined.

Figure 2:
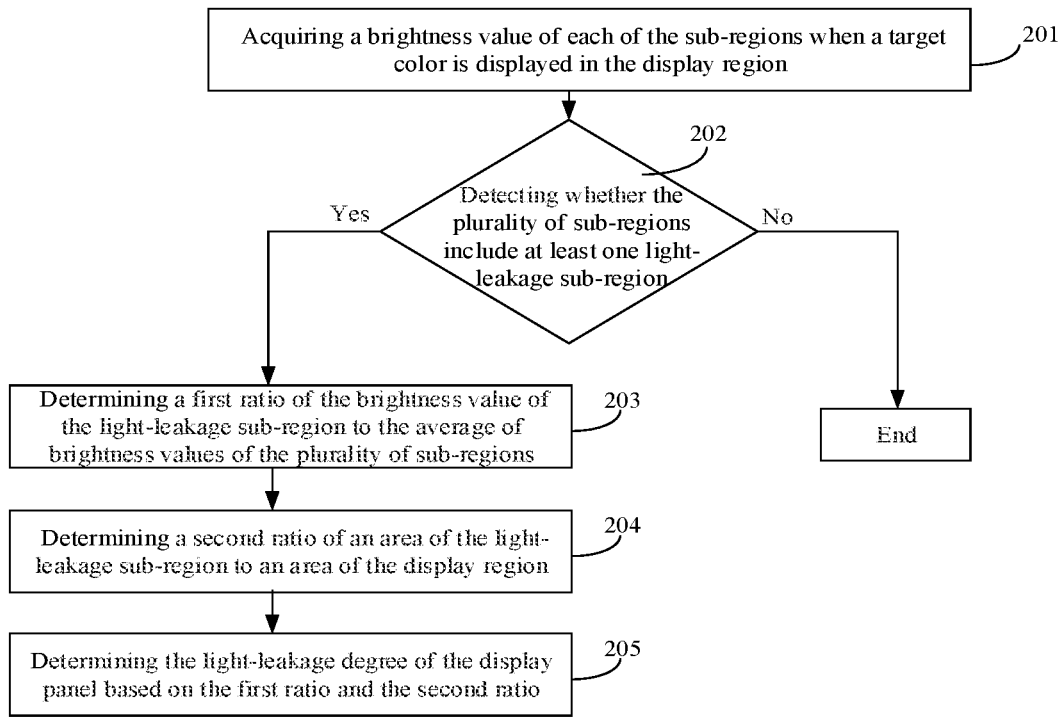
FIG. 2 is a flowchart of another method for determining a light-leakage degree of a display panel according to some embodiments of the present disclosure.

FIG. 2 is a flowchart of another method for determining a light-leakage degree of a display panel according to an embodiment of the present disclosure. The method is applicable to a light-leakage detection device, and the light-leakage detection device may be a computer. As shown in FIG. 2, the method may include the following steps:

In step 201, a brightness value of each of sub-regions of a display region is acquired when a target color is displayed in the display region.

In the embodiment of the present disclosure, the display region of the display panel may be divided into a plurality of sub-regions. When performing light-leakage detection, a target color may be controlled to be displayed in the display region. The light-leakage detection device may acquire a brightness value of each of the sub-regions when the target color is displayed in the display region. Optionally, the target color may be black, such that when the plurality of sub-regions include at least one light-leakage sub-region, a brightness difference between the light-leakage sub-region and other sub-regions may be increased to ensure the reliability of the light-leakage sub-region as detected.

In the embodiment of the present disclosure, the light-leakage detection device may be established a connection with a brightness detection device. The brightness detection device may detect a brightness value of each of the sub-regions when the target color is displayed in the display region, and may send the detected brightness value of each of the sub-regions to the light-leakage detection device. Each of the sub-regions may include one or more pixels.

Optionally, the brightness detection device may be a surface-type photographing optical device or a point-type measuring optical device. The detection accuracy of the surface-type photographing optical device is micron level, that is, the surface-type photographing optical device may detect a brightness value of a micron-level pixel. The detection accuracy of the point-type measuring optical device is millimeter-level, that is, the point-type measuring optical device may detect a brightness value of a millimeter-level detection point.

In the case that the brightness detection device is a surface-type photographing optical device, the brightness detection device may detect a brightness value of each pixel in the display region when the target color is displayed in the display region. After that, the brightness detection device may determine an average of brightness values of a plurality of pixels as a brightness value of a sub-region composed of the plurality of pixels, and send the brightness value of this sub-region to the light-leakage detection device. Correspondingly, the brightness value of each sub-region acquired by the light-leakage detection device is an average of brightness values of a plurality of pixels included in the sub-region.

Alternatively, the brightness detection device may also directly send the detected brightness value of each pixel to the light-leakage detection device. The light-leakage detection device may then determine a brightness value of each sub-region based on a division manner of the sub-region and a brightness value of each pixel thereof.

In the case that the brightness detection device is a point-type measuring optical device, the point-type measuring optical device may detect a brightness value of each detection point in the display region when the target color is displayed in the display region, and send the brightness value of each detection point to the light-leakage detection device. In this scenario, the sub-regions included in the display region may be divided based on positions of detection points, and each sub-region may include one or more detection points. If each sub-region includes one detection point, the detection point may be disposed at a center point of the sub-region. Correspondingly, the light-leakage detection device may determine a brightness value of each detection point as a brightness value of the sub-region where the detection point is disposed. If the sub-region includes a plurality of detection points, the light-leakage detection device may determine an average of brightness values of the plurality of detection points as a brightness value of the sub-region.

Figure 3:
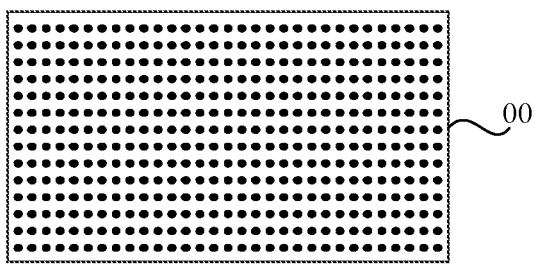
FIG. 3 is a schematic diagram of a plurality of detection points according to some embodiments of the present disclosure.

FIG. 3 is a schematic diagram of a plurality of detection points according to some embodiments of the present disclosure. As shown in FIG. 3, the point-type measuring optical device may detect brightness values of a plurality of detection points in a display region 00. The number of detection points that the point-type measuring optical device is able to detect related to the performance of the point-type measuring optical device. Moreover, since an area of the display region 00 is constant, the more the number of detection points that the point-type measuring optical device is able to detect, the more the number of sub-regions that the display region 00 may be divided into, while the smaller an area of each sub-region, the higher the accuracy of brightness detection.

In step 202, whether the plurality of sub-regions include at least one light-leakage sub-region is detected.

After acquiring brightness values of the plurality of sub-regions, the light-leakage detection device may detect whether the plurality of sub-regions include at least one light-leakage sub-region based on the brightness values of the plurality of sub-regions. If it is detected that the plurality of sub-regions include at least one light-leakage sub-region, the light-leakage detection device may perform a step 203; and if it is detected that the plurality of sub-regions do not include a light-leakage sub-region, it may be determined that the display panel has no problem of light-leakage, and this process ends.

In an embodiment of the present disclosure, the light-leakage detection device may detect whether there is a sub-region with a brightness value greater than or equal to a brightness threshold in the plurality of sub-regions. If such a sub-region exists, the light-leakage detection device may determine the sub-region with a brightness value greater than or equal to the brightness threshold as a light-leakage sub-region; and if such a sub-region does not exist, the light-leakage detection device may determine that there is no light-leakage sub-region in the plurality of sub-regions.

Optionally, the brightness threshold L may satisfy the following formula: $L=L_0+J$, $L_0$ is the average of brightness values of the plurality of sub-regions, J is a minimum perceivable brightness difference. The minimum perceivable brightness difference is a minimum brightness increment of the light-leakage sub-region that the human eye may perceive when the average of brightness values of the plurality of sub-regions is $L_0$. Compared with adopting a constant brightness threshold, an operation of determining the brightness threshold from brightness values of the plurality of sub-regions may improve the flexibility and reliability of the brightness threshold as determined, thereby increasing the reliability of the light-leakage sub-regions as determined.

Optionally, the minimum perceivable brightness difference J may satisfy the following formula:

$$J = K_0 + K_1 \times L_0 - K_2 \times L_0^2 + \sum_{z=3}^{n} K_z \times L_0^z.$$

Alternatively, the minimum perceivable brightness difference J may satisfy the following formula: $J=K \times L_0$.

The n represents an integer greater than or equal to 3. For example, n may be 3. $K_0$ is greater than or equal to 0.01 and less than or equal to 0.05. $K_1$ is greater than or equal to 0.01 and less than or equal to 0.03, and $K_2$ is greater than or equal to 0 and less than or equal to 0.001. When n is 3, $K_3$ is greater than or equal to 0 and less than or equal to 0.001. K is greater than or equal to 0.01 and less than or equal to 0.03. For example, $K_0$ may be equal to 0.02889, $K_1$ may be equal to 0.02087, $K_2$ may be equal to 0.000891, and when n is 3, $K_3$ may be equal to 0.000031.

In step 203, a first ratio of the brightness value of the light-leakage sub-region to the average of brightness values of the plurality of sub-regions is determined.

The light-leakage detection device may determine the average of brightness values of the plurality of sub-regions after detecting that the plurality of sub-regions include at least one light-leakage sub-region, and may determine the first ratio A of the brightness value L of the light-leakage sub-region to the average $L_0$. The first ratio A satisfies the following formula:

$$A = \frac{L}{L_0}.$$

It may be understood that if there are at least two light-leakage sub-regions in the plurality of sub-regions, the light-leakage detection device may determine, for each light-leakage sub-region, the first ratio A of the brightness value of the light-leakage sub-region to the average $L_0$, so that a plurality of first ratios A are acquired.

In an optional implementation of the embodiment of the present disclosure, if there are at least two light-leakage sub-regions in the plurality of sub-regions, and brightness values of the plurality of light-leakage sub-regions are within the same brightness range, the light-leakage detection device may adopt a brightness value of a light-leakage sub-region which is an intermediate brightness value in the plurality of light-leakage sub-regions to represent brightness values of the plurality of light-leakage sub-regions. Correspondingly, the light-leakage detection device may only need to calculate the first ratio A of one light-leakage sub-region, and may determine the first ratio A as the first ratio corresponding to other light-leakage sub-regions. As a result, the computational complexity is effectively reduced. A plurality of brightness ranges are pre-stored in the light-leakage detection device. The intermediate brightness value is an intermediate value in the plurality of brightness values, sorted in ascending order, of the plurality of light-leakage sub-regions within the same brightness range.

In another optional implementation of the embodiment of the present disclosure, if there are at least two light-leakage sub-regions in the plurality of sub-regions, and brightness values of at least two light-leakage sub-regions in the plurality of light-leakage sub-regions are different from each other, the light-leakage detection device may divide the plurality of light-leakage sub-regions into a plurality of light-leakage sub-region groups, wherein each light-leakage sub-region group includes one or more light-leakage sub-regions, and brightness values of respective light-leakage sub-regions included in each light-leakage sub-region group are within the same brightness range. Correspondingly, the light-leakage detection device may respectively determine a brightness value of each light-leakage sub-region group, and then respectively determine the first ratio A of each light-leakage sub-region group.

In this implementation, on the one hand, the light-leakage detection device may group the plurality of light-leakage sub-regions based on the plurality of constant brightness ranges stored in advance, and a brightness value of each light-leakage sub-region group may be a brightness value of a light-leakage sub-region which is an intermediate brightness value in the light-leakage sub-region group, or may be an average of a brightness range of the light-leakage sub-region group. The average of the brightness range refers to an average of the upper limit and the lower limit of the brightness range. The intermediate brightness value is an intermediate value in the plurality of brightness values, sorted in ascending order, of the plurality of light-leakage sub-regions included in the one light-leakage sub-region group.

On the other hand, the light-leakage detection device may determine a minimum brightness value $L_{min}$ and a maximum brightness value $L_{max}$ of the plurality of sub-regions, and determine N brightness ranges based on the minimum brightness value and the maximum brightness value, then group the plurality of light-leakage sub-regions based on the N brightness ranges.

For example, for the $h^{th}$ brightness range in the N brightness ranges divided by the light-leakage detection device in ascending order of brightness values, the lower limit of brightness value may be $L_{min}+(h-1)\times G$, the upper limit of brightness value may be $L_{max}+h\times G$, wherein $$G = \frac{L_{max} - L_{min}}{N},$$

and h is a positive integer not larger than N. In addition, a brightness value of a light-leakage sub-region group whose brightness value is within the $h^{th}$ brightness range may be $$L_{min} + \left(h - \frac{1}{2}\right) \times G.$$

In step 204, a second ratio of an area of the light-leakage sub-region to an area of the display region is determined.

The light-leakage detection device may further determine the second ratio X of the area S of the light-leakage sub-region to the area $S_0$ of the display region, and the second ratio X satisfies:

$$X = \frac{S}{S_0}.$$

It may be understood that, if there are at least two light-leakage sub-regions in the plurality of sub-regions, the light-leakage detection device may determine, for each of the light-leakage sub-regions, the second ratio X of an area of the light-leakage sub-region to the area $S_0$ of the display region, so that a plurality of second ratios X are acquired.

If there are at least two light-leakage sub-regions in the plurality of sub-regions, and the plurality of light-leakage sub-regions are divided into a plurality of light-leakage sub-region groups, the light-leakage detection device may further determine respectively an area of each light-leakage sub-region group, and then determine respectively the second ratio X corresponding to each light-leakage sub-region group. An area of each light-leakage sub-region group may be equal to a sum of areas of respective light-leakage sub-regions included in the light-leakage sub-region group.

Optionally, in the embodiments of the present disclosure, the area of the light-leakage sub-region may be indicated by the number of pixels included in the light-leakage sub-region, and the area of the display region may be indicated by the number of pixels included in the display region.

In step 205, the light-leakage degree of the display panel is determined based on the first ratio and the second ratio.

After determining the first ratio and the second ratio, the light-leakage detection device may determine the light-leakage degree of the display panel based on the first ratio and the second ratio, wherein the light-leakage degree of the display panel is positively correlated with the first ratio and positively correlated with the second ratio. That is, the larger the first ratio, the more serious the light-leakage degree of the display panel; the smaller the first ratio, the lighter the light-leakage degree of the display panel. The larger the second ratio, the more serious the light-leakage degree of the display panel; the smaller the second ratio, the lighter the light-leakage degree of the display panel. For example, the light-leakage degree M of the display panel may satisfy the following formula: $M = A \times X$.

In the embodiment of the present disclosure, if there are at least two light-leakage sub-regions in the plurality of sub-regions, the light-leakage detection device may respectively determine a product of the first ratio and the second ratio corresponding to each light-leakage sub-region to acquire a plurality of products, and determine the light-leakage degree of the display panel based on a sum of the plurality of products.

For example, it is assumed that the plurality of sub-regions includes P (P is an integer greater than 1) number of light-leakage sub-regions, the light-leakage detection device may determine that the light-leakage degree M of the display panel satisfies the following formula:

$$M = \sum_{i=1}^{P} A_i \times X_i;$$

wherein
> the $A_i$ is the first ratio of a brightness value of the $i^{th}$ light-leakage sub-region to the average of brightness values of the plurality of sub-regions, and $X_i$ is the second ratio of an area of the $i^{th}$ light-leakage sub-region to the area of the display region, i being an integer greater than 0 and less than or equal to P.

Alternatively, it is assumed that the P number of light-leakage sub-regions may be divided into Z (Z is an integer greater than 1) number of light-leakage sub-regions, the light-leakage detection device may determine that the light-leakage degree M of the display panel satisfies the following formula:

$$M = \sum_{v=1}^{Z} A_v \times X_v;$$

wherein
> the $A_v$ is the first ratio of a brightness value of the $v^{th}$ light-leakage sub-region group to the average $L_0$ of brightness values of the plurality of sub-regions, and $X_v$ is the second ratio of an area of the $v^{th}$ light-leakage sub-region group to the area of the display region, v being an integer greater than 0 and less than or equal to Z.

In the embodiment of the present disclosure, the plurality of light-leakage sub-regions are divided into a plurality of groups based on brightness values, and the light-leakage degree of the display panel is determined based on the brightness values and areas of the plurality of light-leakage sub-region groups, thereby effectively reducing the computational complexity while ensuring the reliability of the determined light-leakage degree.

In summary, the embodiments of the present disclosure provide a method for determining a light-leakage degree of a display panel. When the plurality of sub-regions include at least one light-leakage sub-region, the light-leakage degree of the display panel can be determined based on an average of brightness values of the plurality of sub-regions and a brightness value of the light-leakage sub-region. Compared with a way that an inspector manually determines a light-leakage degree, the reliability and accuracy of the light-leakage degree of the display panel as determined are effectively improved by the method according to the embodiment of the present disclosure.

Figure 4:
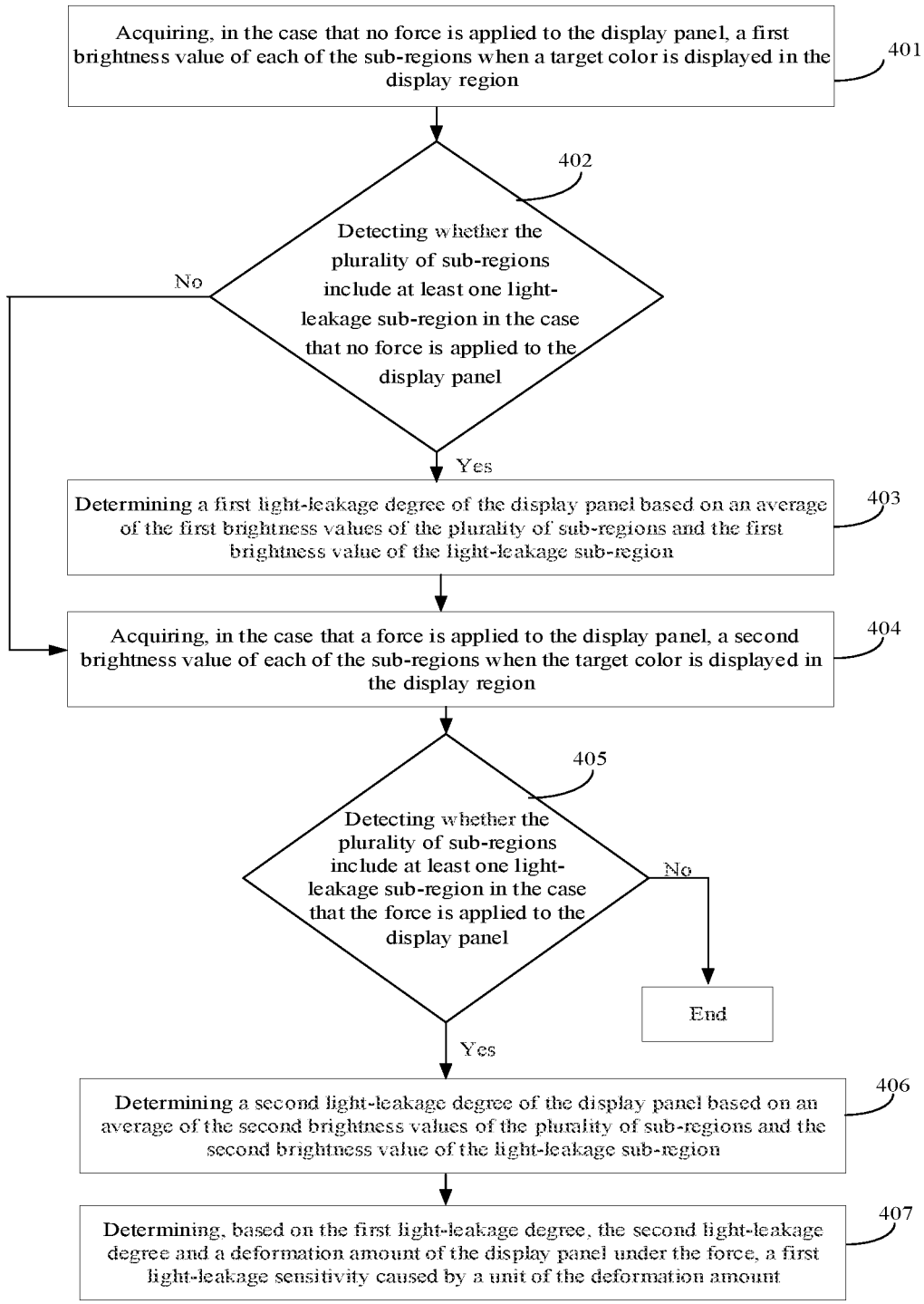
FIG. 4 is a flowchart of yet another method for determining a light-leakage degree of a display panel according to some embodiments of the present disclosure.

FIG. 4 is a flowchart of another method for determining a light-leakage degree of a display panel according to some embodiments of the present disclosure. The method is applicable to a light-leakage detection device, and the light-leakage detection device may be a computer. As shown in FIG. 4, the method may include following steps.

In step 401, a first brightness value of each of the sub-regions when the target color is displayed in the display region is acquired in the case that no force is applied to the display panel.

In the embodiment of the present disclosure, the light-leakage detection device may acquire the first brightness value of each sub-region when the target color is displayed in the display region in the case that no force is applied to the display panel.

Step 402: whether the plurality of sub-regions include at least one light-leakage sub-region is detected in the case that no force is applied to the display panel.

After acquiring the first brightness value of each region, the light-leakage detection device may detect whether there is a light-leakage sub-region in the plurality of sub-regions in the case that no force is applied to the display panel. If it is detected that there is a light-leakage sub-region in the plurality of sub-regions acquired, the light-leakage detection device may perform a step 403; and if it is detected that there is no light-leakage sub-region in the plurality of sub-regions acquired, the light-leakage detection device may determine a first light-leakage degree of the display panel as 0, and may perform a step 407.

In step 403, a first light-leakage degree of the display panel is determined based on an average of the first brightness values of the plurality of sub-regions and a first brightness value of the light-leakage sub-region.

After the light-leakage detection device detected that there is a light-leakage sub-region in the plurality of sub-regions in the case that no force is applied to the display panel, the light-leakage detection device may determine the average of the first brightness values of the plurality of sub-regions, and may determine the first light-leakage degree of the display panel based on the average of the first brightness values of the plurality of sub-regions and the first brightness value of the light-leakage sub-region, then the light-leakage detection device may perform the step 407.

In the embodiment of the present disclosure, when the light-leakage detection device detected that there is a light-leakage sub-region in a plurality of sub-regions while no force is applied to the display panel, the light-leakage detection device may determine the light-leakage degree of the display panel based on the average of brightness values of the plurality of sub-regions and the brightness value of the light-leakage sub-region. Compared with a way that an inspector manually determines a light-leakage degree of a display panel, the reliability, accuracy and efficiency of determining the light-leakage degree of the display panel are effectively improved.

In step 404, in the case that a force is applied to the display panel by a test fixture, a second brightness value of each of the sub-regions when the target color is displayed in the display region is acquired.

The light-leakage detection device may further acquire a second brightness value of each of the sub-regions when the target color is displayed in the display region in the case that a force is applied to the display panel by a test fixture, a direction of the force is perpendicular to a panel surface of the display panel.

In step 405, whether the plurality of sub-regions include at least one light-leakage sub-region in the case that a force is applied to the display panel by a test fixture is detected.

After acquired a second brightness value of each of the sub-regions when the target color is displayed in the display region while a force is applied to the display panel by a test fixture, the light-leakage detection device may detect whether there is a light-leakage sub-region in the plurality of sub-regions. If it is detected that there is a light-leakage sub-region in the plurality of sub-regions acquired while the force is applied to the display panel, the light-leakage detection device may perform a step 406, and if it is detected that there is no light-leakage sub-region in the plurality of sub-regions while the force is applied to the display panel, this process may be ended.

In step 406, a second light-leakage degree of the display panel is determined based on an average of the second brightness values of the plurality of sub-regions and the second brightness value of the light-leakage sub-region.

After the light-leakage detection device detected that there is a light-leakage sub-region in the plurality of sub-regions while a force is applied to the display panel, the light-leakage detection device may determine the second light-leakage degree of the display panel based on the average of the second brightness values of the plurality of sub-regions and the second brightness value of the light-leakage sub-region.

In the embodiment of the present disclosure, after the display panel is mounted into a display device, components around the display panel may apply a force to the display panel, so that there may be a case where the display panel has no problem of light-leakage before the display panel is mounted into the display device, while the display panel has a problem of light-leakage after the display panel is mounted into the display device; or there may be a case where the display panel has a lower light-leakage degree before the display panel is mounted into the display device, while the display panel has a higher light-leakage degree after the display panel is mounted into the display device. In the method according to the embodiments of the present disclosure, a force is applied to the display panel by a test fixture to simulate a force applied to the display panel by components around the display panel after the display panel is mounted to the display device, so that the light-leakage detection device may predict a light-leakage degree of the display device after the display panel is mounted to the display device. For a display panel predicted to have a serious light-leakage degree, the inspector may repair it in time, so as to avoid a case of serious light-leakage of the display panel after the display panel is mounted to the display device, thereby ensuring the reliability of the display device in use.

In step 407, based on the first light-leakage degree, the second light-leakage degree and a deformation amount of the display panel under the force, a first light-leakage sensitivity caused by a unit of the deformation amount is determined.

After the light-leakage detection device determined the first light-leakage degree and the second light-leakage degree, the light-leakage detection device may determine, based on the first light-leakage degree, the second light-leakage degree and the deformation amount of the display panel under the force, the first light-leakage sensitivity caused by a unit of the deformation amount, so as to predict the influence of the unit of the deformation amount on the light-leakage degree of the display panel. The first light-leakage sensitivity is negatively correlated with both the first light-leakage degree and the deformation amount, and is positively correlated with the second light-leakage degree. For example, the deformation amount may be 1 millimeter (mm).

Optionally, the first light-leakage sensitivity $\Delta M$ may satisfy the following formula:

$$\Delta M = \frac{M_1 - M_0}{f},$$

wherein $M_1$ is the second light-leakage degree, $M_0$ is the first light-leakage degree, and f is the deformation amount.

For a specific implementing process of the above steps 401 to 406, reference may be made to the related description of the above steps 301 to 305, which will not be repeated in the embodiment of the present disclosure.

In summary, the embodiments of the present disclosure provide a method for determining a light-leakage degree of a display panel. When a light-leakage detection device detected that the plurality of sub-regions includes at least one light-leakage sub-region, the light-leakage detection device can determine a light-leakage degree of the display panel based on an average of brightness values of the plurality of sub-regions and a brightness value of the light-leakage sub-region. Compared with a way that an inspector manually determines a light-leakage degree, the reliability and accuracy of the light-leakage degree of the display panel as determined are effectively improved by solutions according to the present disclosure.

After the display panel is mounted into the display device, the display panel may be subjected to a pressure in a first direction exerted by surrounding foam and a pulling force in a second direction exerted by a tape, wherein both the first direction and the second direction are perpendicular to the panel surface of the display panel, and the first direction is opposite to the second direction. In the following embodiments, an example will be described wherein a second light-leakage sensitivity caused by a unit of deformation amount is determined through applying a first force to the display panel by a text fixture and applying a second force to the display panel by the text fixture, thereby the light-leakage degree caused by the unit of deformation amount under the forces in two different directions is predicted after the display panel is mounted to the display device.

Figure 5:
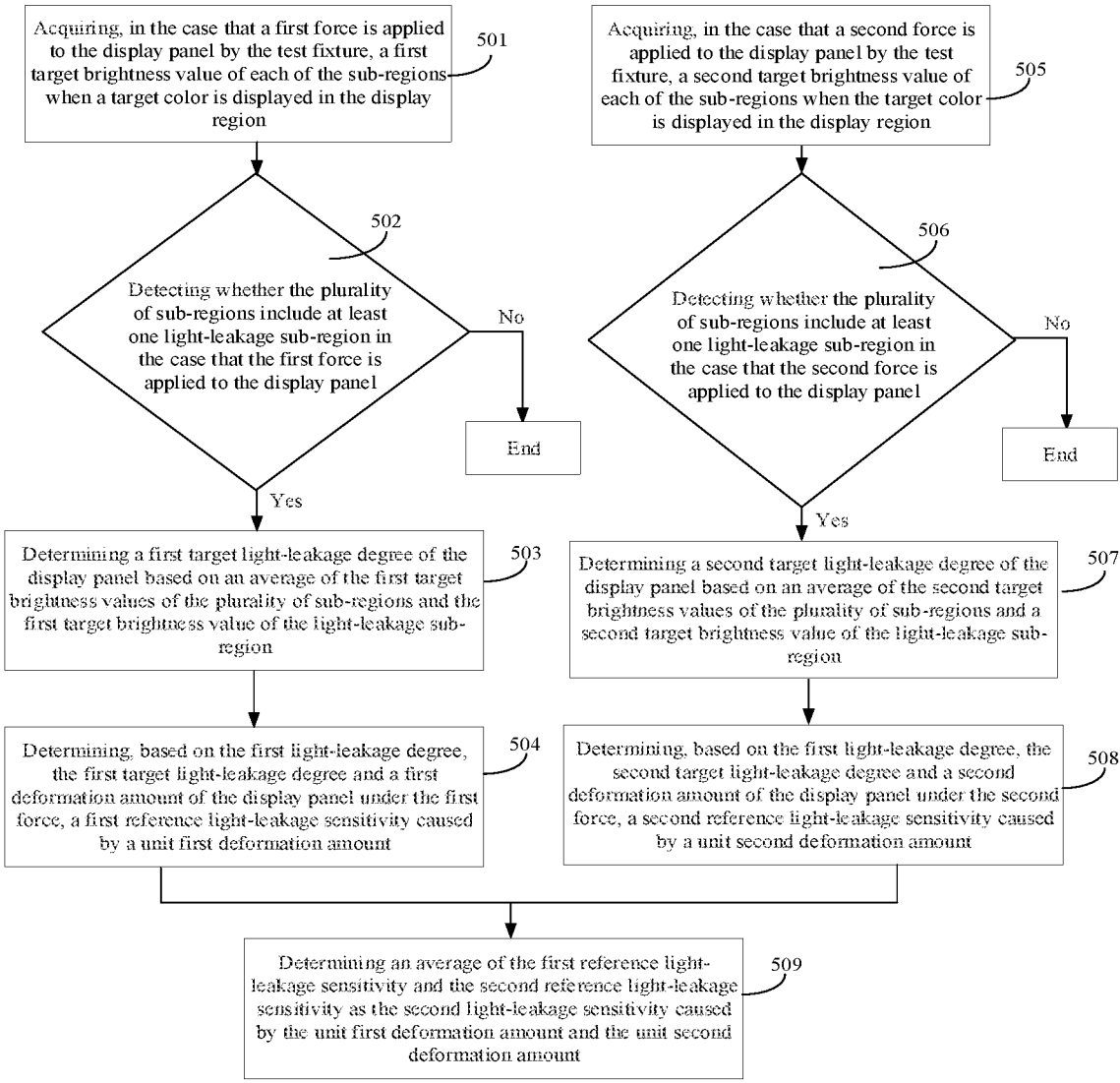
FIG. 5 is a flowchart of still another method for determining a light-leakage degree of a display panel according to some embodiments of the present disclosure.

FIG. 5 is a flowchart of still another method for determining a light-leakage degree of a display panel according to some embodiments of the present disclosure. The method is applicable to a light-leakage detection device, and the light-leakage detection device may be a computer. As shown in FIG. 5, the method may include following steps.

In step 501, a first target brightness value of each of the sub-regions when the target color is displayed in the display region is acquired in the case that a force is applied to the display panel by a test fixture.

In the embodiment of the present disclosure, the above-mentioned second brightness value may include the first target brightness value and the second target brightness.

In Step 502, whether the plurality of sub-regions include at least one light-leakage sub-region is detected in the case that the first force is applied to the display panel.

After acquiring the first target brightness value of each region, the light-leakage detection device may detect whether the plurality of sub-regions include at least one light-leakage sub-region in the case that the first force is applied to the display panel. If it is detected that there is a light-leakage sub-region in the plurality of sub-regions acquired while the first force is applied to the display panel, the light-leakage detection device may perform a step 503; and if it is detected that there is no light-leakage sub-region in the plurality of sub-regions acquired while the first force is not applied to the display panel, this process may be ended.

In step 503, a first target light-leakage degree of the display panel is determined based on an average of the first target brightness values of the plurality of sub-regions and a first target brightness value of the light-leakage sub-region.

In the embodiment of the present disclosure, the above-mentioned second light-leakage degree may include a first target light-leakage degree and a second target light-leakage degree.

In step 504, based on the first light-leakage degree, the second light-leakage degree and a first deformation amount of the display panel under the first force, a first reference light-leakage sensitivity caused by a unit first deformation amount is determined.

Optionally, the first reference light-leakage sensitivity $\Delta m_1$ may satisfy the following formula:

$$\Delta m_1 = \frac{m_1 - M_0}{f_1},$$

wherein $m_1$ is the first target light-leakage degree, $M_0$ is the first light-leakage degree, and $f_1$ is the first deformation amount which may be 1 mm. In the embodiment of the present disclosure, the above-mentioned first light-leakage sensitivity may include the first reference light-leakage sensitivity and a second reference light-leakage sensitivity.

In step 505, a second target brightness value of each of the sub-regions when the target color is displayed in the display region is acquired in the case that a second force is applied to the display panel by the test fixture.

A direction of the second force is opposite to a direction of the first force, and the magnitude of the second force and the magnitude of the first force may be the same or different.

In step 506, whether the plurality of sub-regions include at least one light-leakage sub-region is detected in the case that the second force is applied to the display panel is detected.

After acquiring the second target brightness value of each region, the light-leakage detection device may detect whether the plurality of sub-regions include at least one light-leakage sub-region in the case that the second force is applied to the display panel. If it is detected that there is a light-leakage sub-region in the plurality of sub-regions acquired while the second force is applied to the display panel, the light-leakage detection device may perform a step 507; and if it is detected that there is no light-leakage sub-region in the plurality of sub-regions acquired while the second force is not applied to the display panel, this process may be ended.

In step 507, a second target light-leakage degree of the display panel is determined based on an average of the second target brightness values of the plurality of sub-regions and a second target brightness value of the light-leakage sub-region.

In step 508, based on the first light-leakage degree, the second target light-leakage degree and a second deformation amount of the display panel under the second force, a second reference light-leakage sensitivity caused by a unit second deformation amount is determined.

Optionally, the second reference light-leakage sensitivity $\Delta m_2$ may satisfy the following formula:

$$\Delta m_2 = \frac{m_2 - M_0}{f_2},$$

wherein the $m_2$ is the second target light-leakage degree, $M_0$ is the first light-leakage degree, and the $f_2$ is the second deformation amount which may be 1 mm.

In step 509, an average of the first reference light-leakage sensitivity and the second reference light-leakage sensitivity is determined as the second light-leakage sensitivity caused by the unit first deformation amount and the unit second deformation amount.

In the embodiment of the present application, after determining the first reference light-leakage sensitivity and the second reference light-leakage sensitivity, the light-leakage detection device may determine the average of the first reference light-leakage sensitivity and the second reference light-leakage sensitivity as the second light-leakage sensitivity, and the second light-leakage sensitivity $\Delta m$ may satisfy the following formula:

$$\Delta m = \frac{\Delta m_1 + \Delta m_2}{2}.$$

For a specific implementing process of the above-mentioned steps 501 to 508, reference may be made to the above-mentioned steps 301 to 305 and the above-mentioned step 407, which are not repeated in the embodiments of the present disclosure.

In an embodiment of the present disclosure, the display panel may be a liquid crystal display panel, and the display panel may include a first glass substrate and a second glass substrate disposed on both sides of the liquid crystal. Referring to Table 1, if a thickness of the first glass substrate is 0.4 mm and a thickness of the second glass substrate is 0.5 mm, the light-leakage detection device may determine that, after the first force and the second force are applied to the display panel by the test fixture, the second light-leakage sensitivity caused by the unit first deformation amount and the unit second deformation amount is 15.96%.

If the thickness of the first glass substrate and the thickness of the second glass substrate are 0.3 mm, the light-leakage detection device may determine that, after the first force and the second force are applied to the display panel by the test fixture, the second light-leakage sensitivity caused by the unit first deformation amount and the unit second deformation amount is 8.41%. Since 8.41% is less than 15.96%, it may be determined that the light-leakage degree of the display panel is reduced after the thickness of the first glass substrate and the thickness of the second glass substrate are reduced.

TABLE 1

| Test items | The thickness of the first glass substrate + the thickness of the second glass substrate | $\Delta m$ | Ranking result of light-leakage sensitivity | Human eye observation result |
| --- | --- | --- | --- | --- |
| Before thinning the glass substrates | 0.4 + 0.5 | 15.96% | 2 | Poor |
| After thinning the glass substrate | 0.3 + 0.3 | 8.41% | 1 | Good |

Referring to Table 1, before thinning the glass substrates, the ranking result of the light-leakage sensitivity of the display panel determined by the method according to the embodiment of the present disclosure is 2, and the human eye observation result is poor; after thinning the glass substrates, the ranking result of the light-leakage degree of the display panel determined by the method according to the embodiment of the present disclosure is 1, and the human eye observation result is good, wherein the ranking result 1>the ranking result 2. It can be seen that the light-leakage sensitivity of the display panel determined by the method according to the embodiment of the present disclosure is basically consistent with the human eye observation result.

Referring to Table 2, if a first type of sealant is used in the display panel, and a Young's modulus value of the first type of sealant is greater than or equal to 3.0 and less than or equal to 3.2, the light-leakage detection device may determine that, after the first force and the second force are applied to the display panel by the test fixture, the second light-leakage sensitivity caused by the unit first deformation amount and the unit second deformation amount is 26.08%.

If a second type of sealant is used in the display panel, and a Young's modulus value of the second type of sealant is greater than or equal to 2.0 and less than or equal to 2.2, the light-leakage detection device may determine that, after the first force and the second force are applied to the display panel by the test fixture, the second light-leakage sensitivity caused by the unit first deformation amount and the unit second deformation amount is 20.72%.

If a third type of sealant is used in the display panel, and a Young's modulus value of the third type of sealant is greater than or equal to 1.5 and less than or equal to 1.7, the light-leakage detection device may determine that, after the first force and the second force are applied to the display panel by the test fixture, the second light-leakage sensitivity caused by the unit first deformation amount and the unit second deformation amount is 15.47%.

If a fourth type of sealant is used in the display panel, and a Young's modulus value of the fourth type of sealant is greater than or equal to 0.8 and less than or equal to 1.0, the light-leakage detection device may determine that, after the first force and the second force are applied to the display panel by the test fixture, the second light-leakage sensitivity caused by the unit first deformation amount and the unit second deformation amount is 13.87%. It can be seen that the light-leakage degree of the display panel may be effectively improved by reducing the Young's modulus of the sealant.

TABLE 2

| Sealant type | Young's modulus value | Δm | Ranking result of light-leakage sensitivity | Human eye observation result |
|---|---|---|---|---|
| The first type | 3.0~3.2 | 26.08% | 4 | Very poor |
| The second type | 2.0~2.2 | 20.72% | 3 | Very poor |
| The third type | 1.5~1.7 | 15.47% | 2 | Relatively good |
| The fourth type | 0.8~1.0 | 13.87% | 1 | Good |

With reference to Table 2, it can be seen that or the display panel using the first type of sealant, the ranking result of the light-leakage sensitivity of the display panel determined by the method according to the embodiment of the present disclosure is 4, and the human eye observation result is very poor, for the display panel using the second type of sealant, the ranking result of the light-leakage sensitivity of the display panel determined by the method according to the embodiment of the present disclosure is 3, and the human eye observation result is very poor; for the display panel using the third type of sealant, the ranking result of the light-leakage sensitivity of the display panel determined by the method according to the embodiment of the present disclosure is 2, and the human eye observation result is relatively good; and for the display panel using the fourth type of sealant, the ranking result of the light-leakage sensitivity of the display panel determined by the method according to the embodiment of the present disclosure is 1, and the human eye observation result is good, wherein ranking result 1>ranking result 2>ranking result 3>ranking result 4.

It can be seen from Table 2 that the light-leakage sensitivity of the display panel determined by the method according to the embodiment of the present disclosure is basically consistent with the human eye observation result. In addition, for the display panel using the first type of sealant, the ranking result of the light-leakage sensitivity of the display panel determined by the method according to the embodiment of the present disclosure is 4, and for the display panel using the second type of sealant, the ranking result of the light-leakage sensitivity of the display panel determined by the method according to the embodiment of the present disclosure is 3. However, for the display panel using the first type of sealant and the display panel using the second type of sealant, the human eye observation results are very poor. It can be seen that the human eye cannot further distinguish the similar levels of light-leakage sensitivity, while the light-leakage sensitivities of the display panel can be accurately distinguished by the method according to the embodiment of the present disclosure when the display panel using the first type of sealant and the second type of sealant.

It can be seen from the above analysis that, when it is predicted by the method according to the embodiments of the present disclosure that the light-leakage sensitivity of the display panel is relatively serious, the light-leakage degree of the display panel may be improved by reducing thicknesses of the glass substrates on both sides of the liquid crystal, and/or the light-leakage sensitivity of the display panel may be improved by reducing the Young's modulus values of the sealant, thereby reducing the light-leakage degree of the display panel. It should be noted that, the human eye observation results are results acquired by evaluating the light-leakage degree of the display panel mounted to the display device with human eyes, and the display panel has no problem of light-leakage before the display panel is mounted to the display device.

Figure 6:
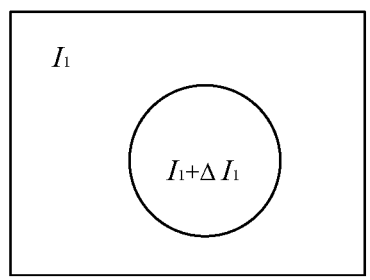
FIG. 6 is a schematic diagram of an average of brightness values of a display region and a brightness value of a light-leakage sub-region according to some embodiments of the present disclosure.
Figure 7:
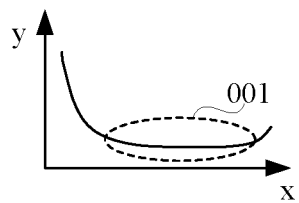
FIG. 7 is a schematic diagram of a relationship between an average brightness value of a display region and a minimum brightness difference according to some embodiments of the present disclosure.

The following describes a process of determining whether a sub-region is a light-leakage sub-region. Optical characterization of light-leakage is that, when the target color is displayed in the display region, there is a region with a brightness value higher than an average brightness value of the display region around the display region that may be perceived by human eyes. A Weber factor K in Weber's law satisfies the following formula:

$$K = \frac{\Delta I_0}{I_0},$$

wherein the $I_0$ represents intensity of an original stimulus, and the $\Delta I_0$ represents a stimulus increment that may cause a differential sensation. Referring to FIG. 6, it is assumed that the average brightness value of the display region is $I_1$, it is acquired based on the Weber factor that the brightness value of the light-leakage sub-region is $I_1+\Delta I_1$ when the light-leakage region may be just distinguished from the display region, wherein $\Delta I_1$ is a minimum brightness difference that may just cause differential sensory stimulation of the human visual system (HVS). FIG. 7 is a schematic diagram of a relationship between an average brightness value of a display region and a minimum brightness difference according to some embodiments of the present disclosure. As shown in FIG. 7, the horizontal axis x in the schematic diagram represents $\log(I_1)$, and the vertical axis y in the schematic diagram represents $$\log\left(\frac{\Delta I_1}{I_1}\right).$$

It can be seen from FIG. 7 that the average brightness value $I_1$ and the minimum brightness difference $\Delta I_1$ of the display region in the constant region 001 in the schematic diagram are in a linear relationship, which conforms to Weber's law. Therefore, according to Weber's law and the optical characterization of light-leakage, it may be determined that the brightness value of the light-leakage sub-region needs to be greater than or equal to $I_1+\Delta I_1$.

In the embodiment of the present disclosure, by displaying screens of different brightness values on the display panel and causing multiple testers to observe the screens of different brightness values, the minimum brightness differences for the multiple testers of observing the screens of different brightness values are acquired, and then the formula for the above-mentioned minimum perceivable brightness difference J may be acquired by an fitting operation based on the minimum brightness differences. Optionally, in the process of displaying screens of different brightness values, the brightness value of the light-leakage sub-region of the display panel is greater than 0 and not greater than 20 nits.

A deriving process of the light-leakage degree M of the display panel will be described below. The physical characterization of the light-leakage degree M of the display panel may be defined as a ratio of radiation energy of the light-leakage sub-region to radiation energy of the display region, that is $$M = \frac{Q_1}{Q_0},$$

wherein $Q_1$ is the radiant energy of the light-leakage region, and $Q_0$ is the total radiant energy of the display region. The light energy Q satisfies $Q=\Phi \times t$, wherein $\Phi$ is luminous flux, and t is time; the flux $\Phi$ satisfies the following formula: $\Phi=H \times w$, wherein H is light intensity, and w is a perspective angle; and the light intensity H satisfies the following formula: $H=l \times s$, wherein l is a brightness value, and s is an area, therefore it may be deduced that the light energy Q satisfies the following formula: $Q=l \times s \times w \times t$, and the light-leakage degree M of the display panel satisfies the following formula:

$$M = \frac{L \times S \times \Omega \times T}{L_0 \times S_0 \times \Omega_0 \times T_0},$$

wherein L is the brightness value of the light-leakage sub-region, S is an area of the light-leakage sub-region, $\Omega$ is the perspective angle of the light-leakage sub-region, T is the duration of viewing the light-leakage sub-region, $L_0$ is the brightness value of the display region, $S_0$ is an area of the display region, $\Omega_0$ is a perspective angle of the display region, and $T_0$ is the duration of viewing the display region.

Duration of viewing the entire display region and duration of viewing the light-leakage sub-region for human eyes are the same, that is, $T=T_0$. In addition, since a viewing angle of human eyes remains unchanged and a sight line of human eyes is approximately perpendicular to the panel surface of the display panel, the perspective angle of the light-leakage sub-region and the perspective angle of the display region may be approximately the same, that is, $\Omega=\Omega_0$. Therefore, it may be derived that the light-leakage degree M of the display panel satisfies the following formula:

$$M = \frac{L \times S}{L_0 \times S_0},$$

that is, $M = A \times X$, wherein $$A = \frac{L}{L_0}, \text{ and } X = \frac{S}{S_0}.$$

In summary, the embodiments of the present disclosure provide a method for determining a light-leakage degree of a display panel. When a light-leakage detection device detected that the plurality of sub-regions of the display panel include at least one light-leakage sub-region, the light-leakage degree of the display panel can be determined based on an average of brightness values of the plurality of sub-regions and a brightness value of the light-leakage sub-region. Compared with a way that an inspector manually determines a light-leakage degree, the reliability and accuracy of the light-leakage degree of the display panel as determined are effectively improved by solutions according to the present disclosure.

It should be noted that, the sequence of steps of the method for determining the light-leakage degree of the display panel according to the embodiments of the present disclosure may be adjusted appropriately, and steps may also be deleted according to situations. For example, steps 404 to 407, or steps 501 to 509 may be deleted according to situations. Any person familiar with the present technical field may easily conceive of a modified method within the technical scope of the present disclosure, which should be covered by the protection scope of the present disclosure, and therefore will not be repeated.

Figure 8:
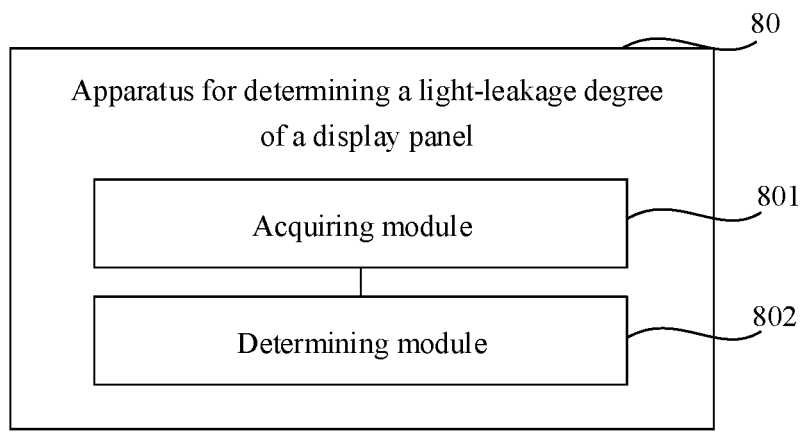
FIG. 8 is a block diagram of an apparatus for determining a light-leakage degree of a display panel according to some embodiments of the present disclosure.

FIG. 8 is a block diagram of an apparatus for determining the light-leakage degree of a display panel according to some embodiments of the present disclosure. The apparatus is applicable to a light-leakage detection device, and the display region of the display panel includes a plurality of sub-regions. As shown in FIG. 8, the apparatus may include the following modules:

an acquiring module 801, configured to acquire a brightness value of each of sub-regions when a target color is displayed in the display region; and a determining module 802, configured to determine, in response to detecting that the plurality of sub-regions includes at least one light-leakage sub-region, the light-leakage degree of the display panel based on an average of brightness values of the plurality of sub-regions and a brightness value of the light-leakage sub-region.

In summary, the embodiments of the present disclosure provide an apparatus for determining a light-leakage degree of a display panel. When a light-leakage detection device detected that the plurality of sub-regions include at least one light-leakage sub-region, the light-leakage degree of the display panel can be determined based on an average of brightness values of the plurality of sub-regions and a brightness value of the light-leakage sub-region. Compared with a way that an inspector manually determines a light-leakage degree, the reliability and accuracy of the light-leakage degree of the display panel as determined are effectively improved by solutions according to the present disclosure.

Optionally, the brightness value of the light-leakage sub-region is greater than or equal to a brightness threshold, and the light-leakage degree is positively correlated with the brightness value of the light-leakage sub-region and is negatively correlated with the average of brightness values of the plurality of sub-regions.

Optionally, the brightness threshold L satisfies the following formula: $L=L_0+J$; wherein the $L_0$ is the average of brightness values of the plurality of sub-regions, and the J is the minimum perceivable brightness difference.

Optionally, the minimum perceivable brightness difference J satisfies:

$$J = K_0 + K_1 \times L_0 - K_2 \times L_0^2 + \sum_{z=3}^{n} K_z \times L_0^z.$$

Alternatively, the minimum perceivable brightness difference J satisfies the following formula: $J=K \times L_0$; wherein n is an integer greater than or equal to 3, $K_0$ is greater than or equal to 0.01 and less than or equal to 0.05, $K_1$ is greater than or equal to 0.01 and less than or equal to 0.03, $K_2$ is greater than or equal to 0 and less than or equal to 0.001; and K is greater than or equal to 0.01 and less than or equal to 0.03.

Optionally, n is equal to 3, and $K_3$ is greater than or equal to 0 and less than or equal to 0.001.

Optionally, the target color is black.

Figure 9:
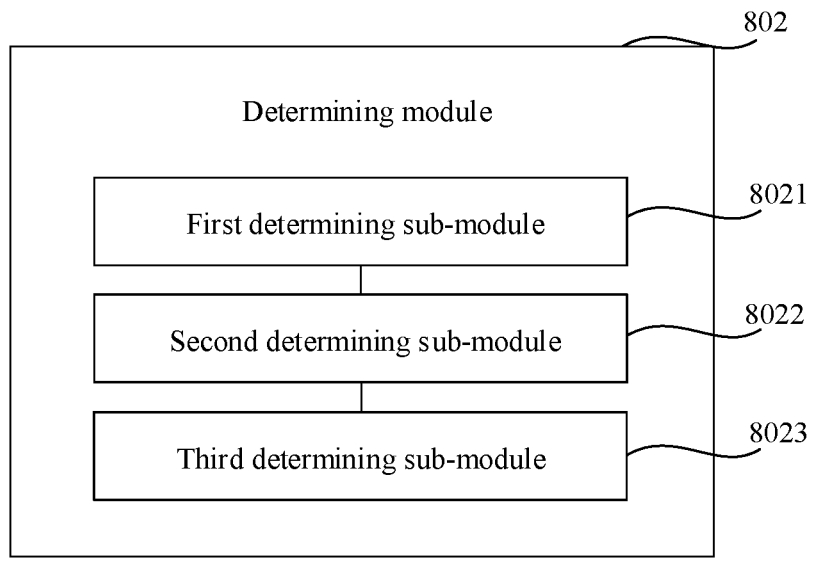
FIG. 9 is a block diagram of a determining module according to some embodiments of the present disclosure.

Referring to FIG. 9, the determining module 802 includes following sub-modules:

a first determining sub-module 8021, configured to determine a first ratio of the brightness value of the light-leakage sub-region to the average of brightness values of the plurality of sub-regions;

a second determining sub-module 8022, configured to determine a second ratio of an area of the light-leakage sub-region to an area of the display region; and a third determining sub-module 8023, configured to determine the light-leakage degree of the display panel based on the first ratio and the second ratio. The light-leakage degree is positively correlated with the first ratio and positively correlated with the second ratio.

Optionally, the plurality of sub-regions includes at least two light-leakage sub-regions, then the third determining sub-module is configured to:

acquire at least two products by respectively determining a product of the first ratio and the second ratio corresponding to each of the light-leakage sub-regions; and determine the light-leakage degree of the display panel based on a sum of the at least two products.

Optionally, the acquiring module 801 is configured to:

acquire, in the case that no force is applied to the display panel, a first brightness value of each of the sub-regions when the target color is displayed in the display region, and acquiring, in the case that a force is applied to the display panel by a test fixture, a second brightness value of each of the sub-regions when the target color is displayed in the display region.

The determining module 802 is configured to:

determine a first light-leakage degree of the display panel based on an average of the first brightness values of the plurality of sub-regions and a first brightness value of the light-leakage sub-region, and determine a second light-leakage degree of the display panel based on an average of the second brightness values of the plurality of sub-regions and a second brightness value of the light-leakage sub-region.

Optionally, the determining module 802 is further configured to determine, based on the first light-leakage degree, the second light-leakage degree and a deformation amount of the display panel under the force, a first light-leakage sensitivity caused by a unit of the deformation amount, wherein the first light-leakage sensitivity is negatively correlated with both the first light-leakage degree and the deformation amount and positively correlated with the second light-leakage degree.

Optionally, the first light-leakage sensitivity $\Delta M$ satisfies the following formula:

$$\Delta M = \frac{M_1 - M_0}{f};$$

wherein $M_1$ is the second light-leakage degree, $M_0$ is the first light-leakage degree, and f is the deformation amount.

Optionally, the acquiring module 801 is configured to:

acquire, in the case that a first force is applied to the display panel by the test fixture, a first target brightness value of each of the sub-regions when the target color is displayed in the display region, and acquiring, in the case that a second force is applied to the display panel by the test fixture, a second target brightness value of each of the sub-regions when the target color is displayed in the display region, wherein a direction of the first force is opposite to a direction of the second force.

The determining module 802 is configured to:

determine a first target light-leakage degree of the display panel based on an average of the first target brightness values of the plurality of sub-regions and a first target brightness value of the light-leakage sub-region, and determine a second target light-leakage degree of the display panel based on an average of the second target brightness values of the plurality of sub-regions and a second target brightness value of the light-leakage sub-region;

determine, based on the first light-leakage degree, the first target light-leakage degree and a first deformation amount of the display panel under the first force, a first reference light-leakage sensitivity caused by a unit first deformation amount, and determine, based on the first light-leakage degree, the second target light-leakage degree and a second deformation amount of the display panel under the second force, a second reference light-leakage sensitivity caused by a unit second deformation amount; and determine an average of the first reference light-leakage sensitivity and the second reference light-leakage sensitivity as a second light-leakage sensitivity caused by the unit first deformation amount and the unit second deformation amount.

In summary, the embodiments of the present disclosure provide an apparatus for determining a light-leakage degree of a display panel. When a light-leakage detection device detected that the plurality of sub-regions include at least one light-leakage sub-region, the light-leakage degree of the display panel can be determined based on an average of brightness values of the plurality of sub-regions and a brightness value of the light-leakage sub-region. Compared with a way that an inspector manually determines a light-leakage degree, the reliability and accuracy of the light-leakage degree of the display panel as determined are effectively improved by solutions according to the present disclosure.

Figure 10:
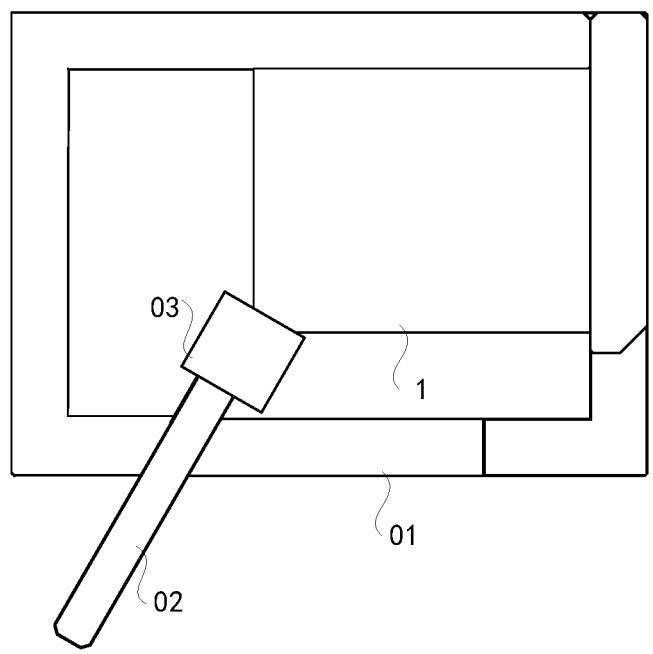
FIG. 10 is a schematic structural diagram of a test fixture for a display panel according to some embodiments of the present disclosure.

FIG. 10 is a schematic structural diagram of a test fixture for a display panel according to some embodiments of the present disclosure. The test fixture is applicable to apply a force to the display panel. As shown in FIG. 10, the test fixture may include a hollow frame 01, an adjusting component 02, and an external force applying component 03.

The frame 01 is configured to fix the display panel 1, and the adjusting component 02 is movably connected to the frame 01 and fixedly connected to the external force applying component 03. The adjusting component 02 is configured to adjust a position of the external force applying component 03 in the frame 01. The external force applying component 03 is configured to apply a force to the display panel 1.

In the embodiments of the present disclosure, the movable connection may mean that a relative position of the adjusting component 02 and the frame 01 is not fixed.

As an optional implementation, the movable connection may be a detachable connection; as another optional implementation, the movable connection refers to that the adjusting component 02 may be rotatably connected to the frame 01. For example, the adjusting component 02 may be rotated relative to the frame 01 to adjust the position of the external force applying component 03 in the frame.

In summary, the embodiments of the present disclosure provide a test fixture for a display panel, and the test fixture may be configured to apply a force to the display panel. Since the adjusting component in the test fixture may adjust the position of the external force applying component in the frame, the test fixture may be adapted to display panels of different sizes, thus its flexibility is high in use.

Figure 11:
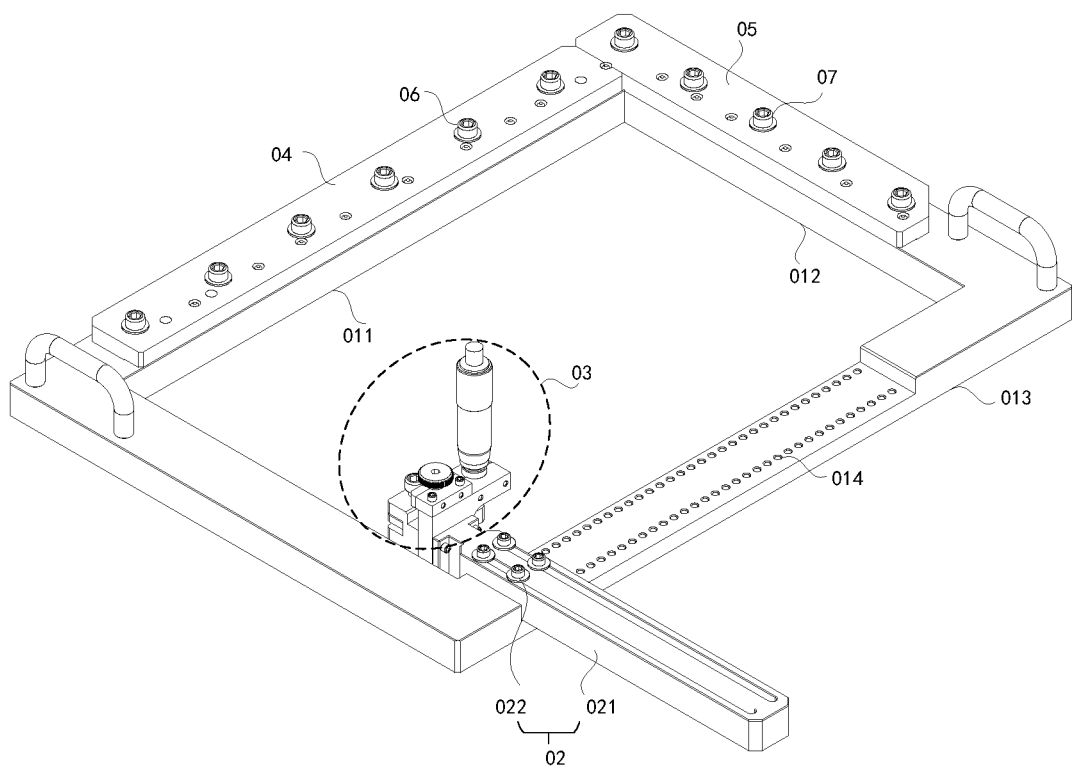
FIG. 11 is a schematic structural diagram of another test fixture for a display panel according to some embodiments of the present disclosure.
Figure 12:
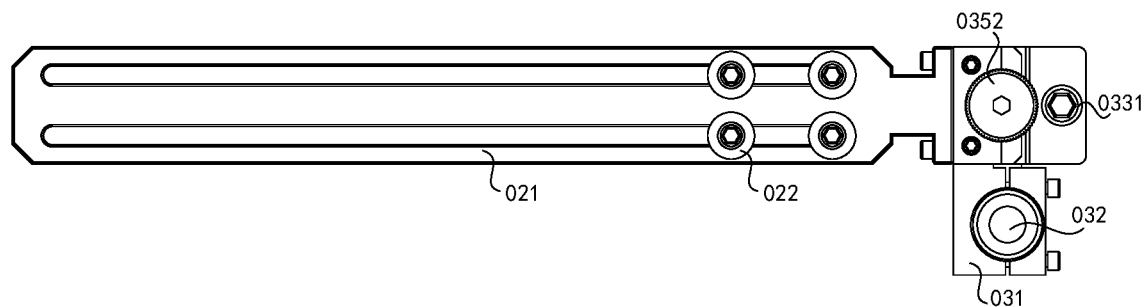
FIG. 12 is a top view of an adjusting component and an external force applying component according to some embodiments of the present disclosure.

Referring to FIG. 11 and FIG. 12, the test fixture may further include a first fixing plate 04 and a second fixing plate 05. The first fixing plate 04 is combined with a first side 011 of the frame to clamp a first side of the display panel 1, and the second fixing plate 05 s combined with a second side 012 of the frame to clamp a second side of the display panel 1. In this way, the first side of the display panel 1 is clamped between the first fixing plate 04 and the first side 011 of the frame, and the second side of the display panel 1 is clamped between the second fixing plate 05 and the second side 012 of the frame, wherein the first side of the display panel 1 is parallel to the first side 011 of the frame 01, and the second side of the display panel 1 is parallel to the second side 012 of the frame 01.

The adjusting component 02 may include a first adjusting rod 021 and at least one fixing member 022, and at least one first through holes (not shown in FIG. 12) is provided on the first adjusting rod 021. A third side 013 of the frame 01 is provided with a plurality of adjusting holes 014, and each fixing member 022 is connected to one of the adjusting holes 014 by passing through one of the first through holes, wherein the first side 011 and the third side 013 are intersected with the second side 012 respectively. Optionally, the frame and the display panel may be in a quadrangle shape, for example, a rectangular shape, and the first side 011 may be perpendicular to the second side 012 and parallel to the third side 013.

Optionally, a plurality of adjusting hole groups are provided on the third side 013 of the frame 01, and each adjusting hole group includes a plurality of adjusting holes 014 arranged in an extending direction of the third side 013, and the plurality of adjusting hole groups are arranged in an extending direction of the second side 012. For example, referring to FIG. 11, the third side 013 is provided with two adjusting hole groups arranged in the extending direction of the second side 012.

The first adjusting rod 021 may be provided with at least one first through hole groups, and each of the first through hole groups includes a plurality of first through holes arranged in the extending direction of the third side 013, and the plurality of first through hole groups are arranged in the extending direction of the second side 012; and correspondingly, each fixing member 022 may pass through one of the first through holes. For example, the third side 013 is provided with two first through hole groups arranged in the extending direction of the third side 013, and each first through hole group includes two first through holes; and correspondingly, the adjusting assembly 02 may include four fixing members 022.

Optionally, the plurality of first through holes of each first through hole group may be communicated in the extending direction of the second side 012. For example, referring to FIG. 11, each first through hole group includes two first through holes communicated in the extending direction of the second side 012. This structure ensures that the position of the external force applying component in the frame may be flexibly adjusted, and then ensures that the test fixture may be adapted to display panels of different sizes, thus its flexibility is high in use.

Figure 13:
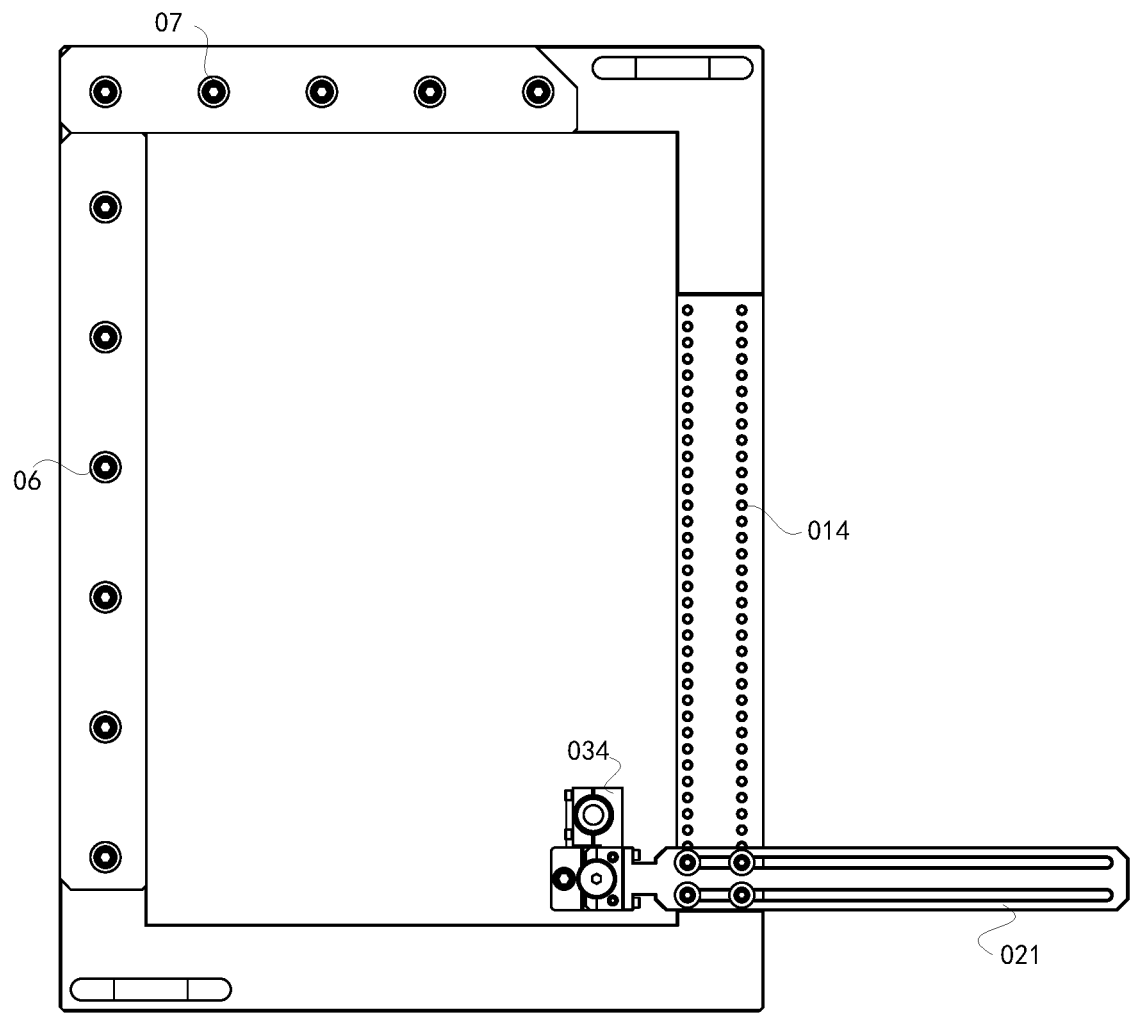
FIG. 13 is a top view of a test fixture for a display panel according to some embodiments of the present disclosure.

With reference to FIG. 11 and FIG. 13, the test fixture may further include a first bolt 06 and a second bolt 07.

The first fixing plate 04 and the first side 011 of the frame 01 are both provided with a second through hole (not shown in FIG. 11 and FIG. 13). The first bolt 06 is connected to the first side 011 of the frame 01 by passing through the second through hole. The second fixing plate 05 and the second side 012 of the frame 01 are both provided with a third through hole, and the second bolt 07 is connected to the second side 012 of the frame 01 by passing through the third through hole. By rotating the first bolt and the second bolt, a distance between the frame and the fixing plate may be effectively adjusted, therefore the test fixture may be adapted to display panels of different thicknesses, and its flexibility is high in use.

Optionally, a plurality of second through holes (not shown in FIG. 11 and FIG. 13) may be provided on the first fixing plate 04 and the first side 011 of the frame 01, and the plurality of second through holes are arranged in the extending direction of the first side 011. Correspondingly, the test fixture may include a plurality of first bolts 06, and each of the first bolt 06 is connected to the first side 011 of the frame by passing through a corresponding first through hole.

Optionally, a plurality of third through holes (not shown in FIG. 11 and FIG. 13) may be provided on the second fixing plate 05 and the second side 012 of the frame 01, and the plurality of third through holes are arranged in the extending direction of the second side 012. Correspondingly, the test fixture may include a plurality of second bolts 07, and each of the second bolts 07 is connected to the second side of the frame by passing through a corresponding third through hole.

Figure 14:
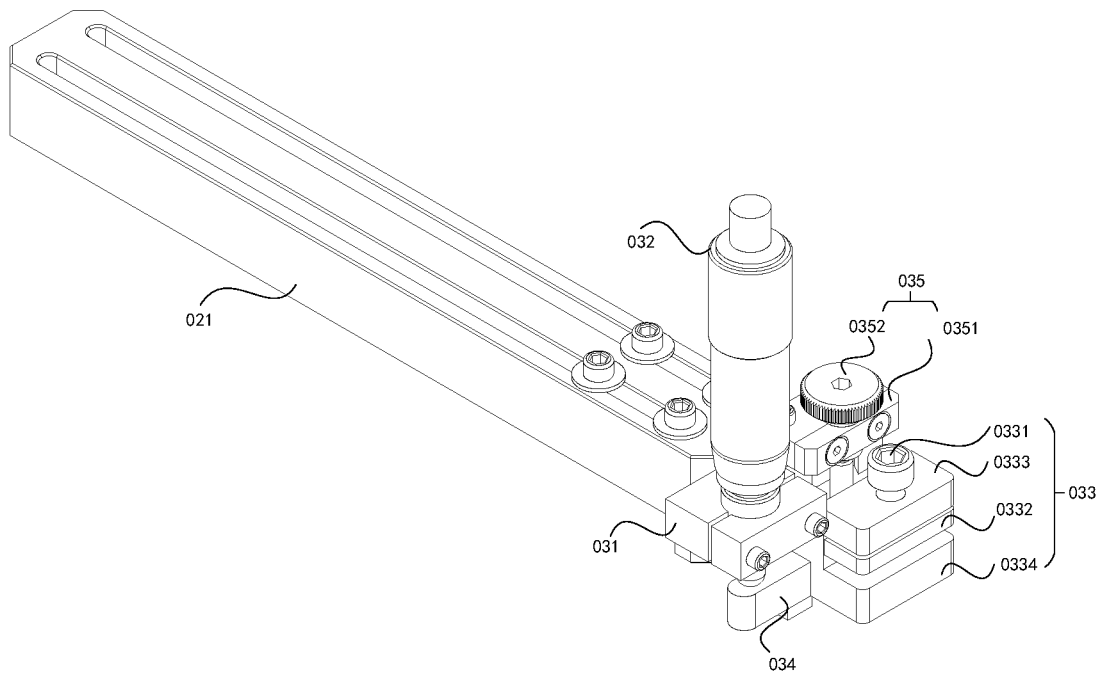
FIG. 14 is a schematic structural diagram of an adjusting component and an external force applying component according to some embodiments of the present disclosure.
Figure 15:
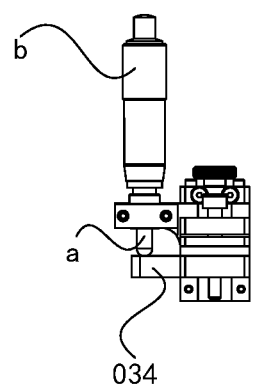
FIG. 15 is a schematic structural diagram of an external force applying component according to some embodiments of the present disclosure.

Referring to FIG. 14 and FIG. 15, the external force applying assembly 03 may include a third fixing plate 031, a second adjusting rod 032, a clamping member 033, a contacting member 034 and an adjusting member 035.

The third fixing plate 031 is fixedly connected to the first adjusting rod 021, and the third fixing plate 031 is provided with a fourth through hole (not shown in FIG. 14 and FIG. 15). One end "a" of the second adjusting rod 032 passes through the fourth through hole, and the other end "b" of the second adjusting rod 032 adjusts a length of a part of the one end "a" of the second adjusting rod 032 that protrudes from the fourth through hole, wherein an extending direction of the second adjusting rod 032 is perpendicular to the display surface of the display panel 1. Optionally, the second adjusting rod 032 may be a micrometer, and the other end of the second adjusting rod 032 may be a knob.

The clamping member 033 is fixedly connected to the contacting member 034, and the clamping member 033 is configured to clamp the display panel 1. The clamping member 033 is configured for clamping a corner of the display panel 1, where a third side and a fourth side of the display panel 1 are intersected with each other. Optionally, the display panel 1 may be in a rectangular shape, and the third side of the display panel 1 is parallel to the first side of the display panel 1 and is perpendicular to the fourth side of the display panel 1.

The adjusting member 035 is respectively connected to the first adjusting rod 021 and the clamping member 033, and the adjusting member 035 is configured to adjust a position of the clamping member 033 in a direction perpendicular to the display surface of the display panel 1, so that the contacting member 034 fixedly connected to the clamping member 033 is in contact with the one end "a" of the second adjusting rod 032. Therefore, a force is applied to the display panel 1 clamped by the clamping member 033, so that a deformation amount of the display panel 1 is generated under the force.

Referring to FIG. 14, the adjusting member 035 may include a fourth fixing plate 0351 and a first screw 0352. The fourth fixing plate 0351 is fixedly connected to the first adjusting rod 021, and the fourth fixing plate 0351 is provided with a sixth through hole (not shown in the figure). One end of the first screw 0352 is fixedly connected to the clamping member 033 by passing through the sixth through hole. The first screw 0352 is configured to adjust a position of the clamping member 033 in a direction perpendicular to the display surface of the display panel 1.

The clamping member 033 may include two fifth fixing plates arranged oppositely and fixedly connected, a second screw 0331 and a movable plate 0332 disposed between the two fifth fixing plates.

One fifth fixing plate 0333 is provided with a seventh through hole (not shown in the figure). One end of the second screw 0331 is fixedly connected to the movable plate 0332 by passing through the seventh through hole. The second screw 0331 is configured to adjust a distance between the movable plate 0332 and either of the fifth fixing plates, so as to clamp the display panel 1 between the one fifth fixing plate 0333 and the movable plate 0332, or to clamp the display panel 1 between the movable plate 0332 and another fifth fixing plate 0334.

In the embodiment of the present disclosure, a process of applying a first force and a second force by the test fixture to the display panel 1 will be described. Firstly, the first side of the display panel 1 is inserted into a groove of the first side 011 of the frame 01, and the second side of the display panel 1 is inserted into a groove of the second side 012 of the frame 01. After that, the corner of the display panel 1 is placed between the movable plate 0332 and one fifth fixing plate 0333, and a distance between the movable plate 0332 and the one fixing plate 0333 is reduced by rotating the second screw 0331, so as to ensure that the display panel 1 is clamped between the movable plate 0332 and one fifth fixing plate 0333. Then the first screw 0352 is rotated to make the clamping member 033 and the contacting member 034 to move in the first direction until a distance between the contacting member 034 and the one end "a" of the second adjusting rod 032 is greater than a first length. After that, the other end "b" of the second adjusting rod 032 is rotated to adjust a length of the one end "a" of the second adjusting rod 032 that protrudes from the fourth through hole from a target length to the first length. Then the first screw 0352 is rotated to drive the clamping member 033 and the contacting member 034 to move in the second direction until the contacting member 034 comes into contact with the one end "a" of the second adjusting rod 032. In this way, a first force is applied to the display panel 1, and the display panel 1 generates a first deformation amount in the first direction under the first force.

In a case that the length of the one end "a" of the second adjusting rod 032 protruding from the fourth through hole is the target length, if the contacting member 034 is in contact with the one end "a" of the second adjusting rod 032, the display panel clamped by the clamping member 033 would not generate a deformation amount. The first direction is a direction distal from the other end "b" of the second adjusting rod 032, and the second direction is a direction proximal to the other end "b" of the second adjusting rod 032. For example, if the first deformation amount is 1 mm, it means that the display panel generates a deformation amount of 1 mm in the first direction under the first force, that is, a downward pressure is applied to the display panel and the display panel is pressed down by 1 mm under this pressure.

Thereafter, the other end "b" of the second adjusting rod 032 is rotated to adjust a length of the one end "a" of the second adjusting rod 032 protruding from the fourth through hole from the first length to a second length. After that, the first screw 0352 is rotated so that the first screw 0352 drives the clamping member 033 and the contacting member 034 to move in the second direction until the contacting member 034 comes into contact with the one end "a" of the second adjusting rod 032. In this way, a second force is applied to the display panel 1, and the display panel 1 generates a second deformation amount in the second direction under the second force. The second length is less than the first length and the target length. For example, if the second deformation amount is 1 mm, it means that the display panel generates a deformation amount of 1 mm in the second direction under the second force, that is, an upward pulling force is applied to the display panel and the display panel is moved up by 1 mm under this pulling force.

In the embodiments of the present disclosure, the above-mentioned through holes may all be threaded holes.

In summary, the embodiments of the present disclosure provide a test fixture for a display panel, and the test fixture may be configured to apply a force to the display panel. Since the adjusting component in the test fixture may adjust the position of the external force applying component in the frame, the test fixture may be adapted to display panels of different sizes, thus its flexibility is high in use.

An embodiment of the present disclosure provides a system for determining a light-leakage degree of a display panel. The system may include a light-leakage detection device and the test fixture shown in any one of FIG. 10 to FIG. 15, wherein the light-leakage detection device may include a device 80 for determining a light-leakage degree of a display panel as shown in FIG. 8 and FIG. 9 or in FIG. 9.

Figure 16:
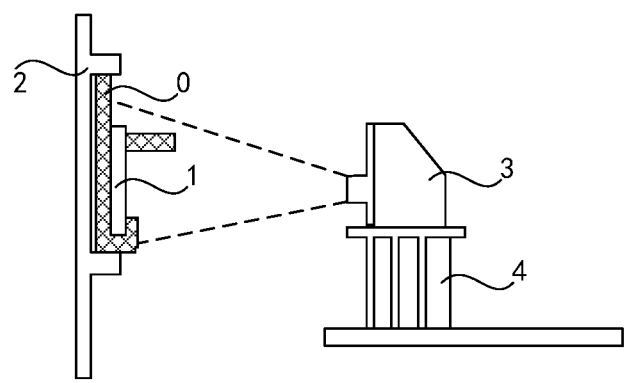
FIG. 16 is a schematic structural diagram of a system for determining a light-leakage degree of a display panel according to some embodiments of the present disclosure.

As shown in FIG. 16, the system may further include a bracket 2, a brightness detection device 3, and a support table 4. The bracket 2 is configured to clamp the test fixture 0, and the support table 4 is configured to support the brightness detection device 3. A detection surface of the brightness detection device 3 is parallel to the display surface of the display panel 1, thus it is ensured that the brightness detection device 3 may accurately detect a brightness value of each of the sub-regions.

Optionally, if the brightness detection device 3 is a surface-type photographing optical device, the detection surface is a photographing surface of the surface-type photographing optical apparatus. When acquiring brightness values of a plurality of sub-regions, the system needs to be placed in a dark room.

Figure 17:
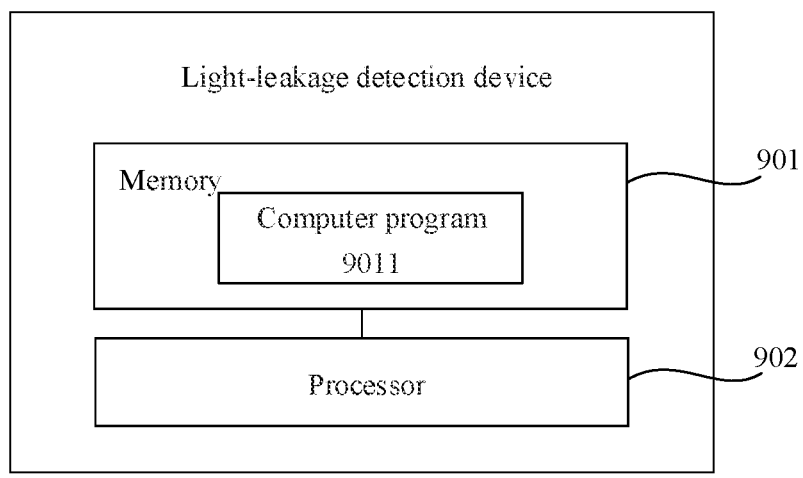
FIG. 17 is a schematic structural diagram of a light-leakage detecting device according to some embodiments of the present disclosure.

An embodiment of the present application provides a light-leakage detection device. As shown in FIG. 17, the light-leakage detection device may include: a memory 901, a processor 902, and at least one computer program 9011 stored in the memory 901. The processor 902, when executing the at least one computer program 9011, is caused to perform the method for determining the light-leakage degree of the display panel in the above-mentioned method embodiments, for example, the method shown in FIG. 1, FIG. 2, FIG. 4 or FIG. 5.

An embodiment of the present disclosure provides a computer-readable storage medium storing at least one instruction therein. The at least one instruction, when executed by a processor, causes the processor to perform the method for determining a light-leakage degree of a display panel in the above-mentioned method embodiments, for example, the method shown in FIG. 1, FIG. 2, FIG. 4 or FIG. 5.

An embodiment of the present disclosure provides a computer program product containing at least one instruction. The computer program product, when run on a computer, causes the computer to execute the method for determining a light-leakage degree of a display panel in the above-mentioned method embodiments, for example, the method shown in FIG. 1, FIG. 2, FIG. 4 or FIG. 5.

In the embodiments of the present disclosure, the terms "first", "second", "third", "fourth", "fifth", "sixth" and "seventh" are only used for descriptive purposes, and cannot be understood as indicating or implying relative importance. The term "at least one" in the embodiments of the present disclosure means one or more than one. The term "a plurality of" in the embodiments of the present disclosure means two or more than two. The term "and/or" in the embodiments of the present disclosure is merely an association relationship that describes associated objects, which indicates that there may be three relationships, for example, A and/or B may mean that there are three cases: A exists alone, A and B exist at the same time, and B exists alone.

The above descriptions are only optional embodiments of the present disclosure and are not intended to limit the present disclosure. Any modification, equivalent replacement, improvement, etc. made within the spirit and principle of the present disclosure shall be included in the scope of protection of the present disclosure.

What is claimed is:

1. A method for determining a light-leakage degree of a display panel, applicable to a light-leakage detecting device, wherein a display region of the display panel comprises a plurality of sub-regions, and the method comprises:
   acquiring a brightness value of each of the sub-regions when a target color is displayed in the display region;
   determining a sub-region with the brightness value greater than or equal to a brightness threshold as a light-leakage sub-region; and
   determining the light-leakage degree of the display panel based on an average of brightness values of the plurality of sub-regions and the brightness value of the light-leakage sub-region;
   wherein determining the light-leakage degree of the display panel based on the average of brightness values of the plurality of sub-regions and the brightness value of the light-leakage sub-region comprises:
   determining a first ratio of the brightness value of the light-leakage sub-region to the average of brightness values of the plurality of sub-regions;
   determining a second ratio of an area of the light-leakage sub-region to an area of the display region; and
   determining the light-leakage degree of the display panel based on the first ratio and the second ratio, wherein the light-leakage degree is positively correlated with the first ratio and positively correlated with the second ratio;
   wherein the plurality of sub-regions comprises at least two light-leakage sub-regions; and determining the light-leakage degree of the display panel based on the first ratio and the second ratio comprises:
   acquiring at least two products by respectively determining a product of the first ratio and the second ratio corresponding to each of the at least two light-leakage sub-regions; and
   determining the light-leakage degree of the display panel based on a sum of the at least two products.

2. The method according to claim 1, wherein the target color is black.

3. A method for determining a light-leakage degree of a display panel, applicable to a light-leakage detecting device, wherein a display region of the display panel comprises a plurality of sub-regions, and the method comprises:
   acquiring a brightness value of each of the sub-regions when a target color is displayed in the display region;
   determining a sub-region with the brightness value greater than or equal to a brightness threshold as a light-leakage sub-region; and
   determining the light-leakage degree of the display panel based on an average of brightness values of the plurality of sub-regions and the brightness value of the light-leakage sub-region;
   wherein acquiring the brightness value of each of the sub-regions when the target color is displayed in the display region comprises:
   acquiring, in the case that no force is applied to the display panel, a first brightness value of each of the sub-regions when the target color is displayed in the display region, and acquiring, in the case that a force is applied to the display panel by a test fixture, a second brightness value of each of the sub-regions when the target color is displayed in the display region;
   and determining the light-leakage degree of the display panel based on the average of brightness values of the plurality of sub-regions and the brightness value of the light-leakage sub-region comprises:
   determining a first light-leakage degree of the display panel based on an average of the first brightness values of the plurality of sub-regions and a first brightness value of the light-leakage sub-region, and determining a second light-leakage degree of the display panel based on an average of the second brightness values of the plurality of sub-regions and a second brightness value of the light-leakage sub-region; and
   the method further comprises:
   determining, based on the first light-leakage degree, the second light-leakage degree and a deformation amount of the display panel under the force, a first light-leakage sensitivity caused by a unit of the deformation amount, wherein the first light-leakage sensitivity is negatively correlated with both the first light-leakage degree and the deformation amount and positively correlated with the second light-leakage degree.

4. The method according to claim 3, wherein the first light-leakage sensitivity ΔM satisfies:

$$\Delta M = \frac{M_1 - M_0}{f};$$

wherein the $M_1$ is the second light-leakage degree, the $M_0$ is the first light-leakage degree, and the f is the deformation amount.

5. The method according to claim 3, wherein acquiring, in the case that the force is applied to the display panel by the test fixture, the second brightness value of each of the sub-regions when the target color is displayed in the display region comprises:

acquiring, in the case that a first force is applied to the display panel by the test fixture, a first target brightness value of each of the sub-regions when the target color is displayed in the display region, and acquiring, in the case that a second force is applied to the display panel by the test fixture, a second target brightness value of each of the sub-regions when the target color is displayed in the display region, wherein a direction of the first force is opposite to a direction of the second force;

determining the second light-leakage degree of the display panel based on the average of the second brightness values of the plurality of sub-regions and the second brightness value of the light-leakage sub-region comprises:

determining a first target light-leakage degree of the display panel based on an average of the first target brightness values of the plurality of sub-regions and a first target brightness value of the light-leakage sub-region, and determining a second target light-leakage degree of the display panel based on an average of the second target brightness values of the plurality of sub-regions and a second target brightness value of the light-leakage sub-region;

determining, based on the first light-leakage degree, the second light-leakage degree and the deformation amount of the display panel under the force, the first light-leakage sensitivity caused by the unit of the deformation amount comprises:

determining, based on the first light-leakage degree, the first target light-leakage degree and a first deformation amount of the display panel under the first force, a first reference light-leakage sensitivity caused by a unit first deformation amount, and determining, based on the first light-leakage degree, the second target light-leakage degree and a second deformation amount of the display panel under the second force, a second reference light-leakage sensitivity caused by a unit second deformation amount; and the method further comprises:

determining an average of the first reference light-leakage sensitivity and the second reference light-leakage sensitivity as a second light-leakage sensitivity caused by the unit first deformation amount and the unit second deformation amount.

6. A test fixture for a display panel, applicable to the method for determining the light-leakage degree of the display panel as defined in claim 3, and the test fixture comprising a hollow frame, an adjusting component, and an external force applying component; wherein the frame is configured to fix the display panel;

the adjusting component is movably connected to the frame and fixedly connected to the external force applying component, and the adjusting component is configured to adjust a position of the external force applying component in the frame; and the external force applying component is configured to apply a force to the display panel.

7. The test fixture according to claim 6, wherein the test fixture further comprises a first fixing plate and a second fixing plate;

the first fixing plate, combined with a first side of the frame, is configured to clamp a first side of the display panel;

the second fixing plate, combined with a second side of the frame, is configured to clamp a second side of the display panel;

the adjusting component comprises a first adjusting rod and at least one fixing members, the first adjusting rod is provided with at least one first through hole, a third side of the frame is provided with a plurality of adjusting holes, and each of the fixing members is configured to be connected to one of the adjusting holes by passing through one of the first through holes; and wherein the first side and the third side are intersected with the second side respectively.

8. The test fixture according to claim 7, wherein the test fixture further comprises a first bolt and a second bolt;

both the first fixing plate and the first side of the frame are provided with a second through hole, the first bolt being configured to be connected to the first side of the frame by passing through the second through hole; and both the second fixing plate and the second side of the frame are provided with a third through hole, the second bolt being configured to be connected to the second side of the frame by passing through the third through hole.

9. The test fixture according to claim 6, wherein the external force applying component comprises: a third fixing plate, a second adjusting rod, a clamping member, a contacting member and an adjusting member;

the third fixing plate is fixedly connected to the first adjusting rod, the third fixing plate is provided with a fourth through hole, one end of the second adjusting rod is configured to pass through the fourth through hole, and the other end of the second adjusting rod is configured to adjust a length of a part of the second adjusting rod that protrudes from the fourth through hole;

the clamping member is fixedly connected to the contacting member and is configured to clamp the display panel; and the adjusting member is respectively connected to the first adjusting rod and the clamping member, and the adjusting member is configured to adjust a position of the clamping member in a direction perpendicular to a display surface of the display panel, such that the contacting member fixedly connected to the clamping member is in contact with the one end of the second adjusting rod.

10. The test fixture according to claim 8, wherein the adjusting member comprises: a fourth fixing plate and a first screw; and the fourth fixing plate is fixedly connected to the first adjusting rod, the fourth fixing plate is provided with a sixth through hole, one end of the first screw is fixedly connected to the clamping member by passing through the sixth through hole, and the first screw is configured to adjust a position of the clamping member in a direction perpendicular to a display surface of the display panel.

11. The test fixture according to claim 8, wherein the clamping member comprises two fifth fixing plates arranged oppositely and fixedly connected, a second screw and a movable plate disposed between the two fifth fixing plates; and wherein one of the fifth fixing plates is provided with a seventh through hole, one end of the second screw is fixedly connected to the movable plate by passing through the seventh through hole, and the second screw is configured to adjust a distance between the movable plate and any one of the fifth fixing plates.

12. A non-transitiory computer-readable storage medium storing at least one instruction therein, wherein the at least one instruction, when loaded and executed by a processor, causes the processor to perform the method for determining the light-leakage degree of the display panel as defined in claim 1.

13. A non-transitiory computer-readable storage medium storing at least one instruction therein, wherein the at least one instruction, when loaded and executed by a processor, causes the processor to perform the method for determining the light-leakage degree of the display panel as defined in claim 3.

* * * * *